United States Patent
Way

(10) Patent No.: US 7,120,359 B2
(45) Date of Patent: Oct. 10, 2006

(54) BROADCAST AND SELECT ALL OPTICAL NETWORK

(75) Inventor: Winston Way, Irvine, CA (US)

(73) Assignee: OpVista Incorporated, Milpitas, CA (US)

(*) Notice: Subject to any disclaimer, the term of this patent is extended or adjusted under 35 U.S.C. 154(b) by 320 days.

(21) Appl. No.: 10/178,071

(22) Filed: Jun. 19, 2002

(65) Prior Publication Data

US 2003/0025961 A1 Feb. 6, 2003

Related U.S. Application Data

(63) Continuation-in-part of application No. 09/990,196, filed on Nov. 21, 2001, now Pat. No. 6,895,184, and a continuation-in-part of application No. 09/575,811, filed on May 22, 2000, now Pat. No. 6,525,857.

(60) Provisional application No. 60/309,220, filed on Jul. 31, 2001, provisional application No. 60/301,564, filed on Jun. 28, 2001, provisional application No. 60/299,784, filed on Jun. 20, 2001.

(51) Int. Cl.
*H04B 10/20* (2006.01)

(52) U.S. Cl. .................... 398/59; 398/1; 398/2; 398/3; 398/4; 398/5; 398/70; 398/71; 398/72; 398/82; 398/83; 398/85; 398/50; 398/56; 398/45; 398/48; 398/49

(58) Field of Classification Search .............. 398/1, 398/3, 5, 7, 59, 70, 71, 82, 83, 85, 2, 4, 79, 398/56, 45, 50, 48, 49

See application file for complete search history.

(56) References Cited

U.S. PATENT DOCUMENTS

| | | | |
|---|---|---|---|
| 5,301,058 A | 4/1994 | Olshansky | 359/188 |
| 5,333,000 A | 7/1994 | Hietala et al. | 342/368 |
| 5,442,623 A * | 8/1995 | Wu | 370/224 |
| 5,596,436 A | 1/1997 | Sargis et al. | 359/132 |
| 5,717,795 A * | 2/1998 | Sharma et al. | 385/24 |
| 5,742,416 A * | 4/1998 | Mizrahi | 398/92 |
| 5,745,273 A | 4/1998 | Jopson | 359/181 |
| 5,949,560 A | 9/1999 | Roberts et al. | 359/110 |
| 5,982,963 A | 11/1999 | Feng et al. | 385/37 |
| 6,008,931 A | 12/1999 | von Helmolt et al. | 359/326 |
| 6,023,359 A * | 2/2000 | Asahi | 398/5 |
| 6,084,694 A | 7/2000 | Milton et al. | |
| 6,088,141 A | 7/2000 | Merli et al. | |
| 6,118,566 A | 9/2000 | Price | 359/18 |
| 6,130,766 A | 10/2000 | Cao | 359/161 |
| 6,163,553 A | 12/2000 | Pfeiffer | 372/6 |
| 6,192,173 B1 | 2/2001 | Solheim et al. | |
| 6,195,186 B1 * | 2/2001 | Asahi | 398/5 |

(Continued)

OTHER PUBLICATIONS

S. Walklin, "Multilevel Signaling For Increasing The Reach Of 10Gb/S Lightwave Systems" *Journal of Lightwave Technology*, vol. 17, No. 11, Nov. 1999.

(Continued)

*Primary Examiner*—Hanh Phan
(74) *Attorney, Agent, or Firm*—Fish & Richardson P.C.

(57) ABSTRACT

An all optical network for optical signal traffic has at least a first ring with at least one transmitter and one receiver. The first ring includes a plurality of network nodes. At least a first add/drop broadband coupler is coupled to the first ring. The broadband coupler includes an add port and a drop port to add and drop wavelengths to and or from the first ring, a pass-through direction and an add/drop direction. The first add/drop broadband coupler is configured to minimize a pass-through loss in the first ring and is positioned on the first ring.

36 Claims, 41 Drawing Sheets

U.S. PATENT DOCUMENTS

| | | |
|---|---|---|
| 6,351,323 B1 | 2/2002 | Onaka et al. |
| 6,657,952 B1 * | 12/2003 | Shiragaki et al. ............ 370/223 |
| 2002/0015553 A1 | 2/2002 | Claringburn et al. |
| 2003/0169470 A1 * | 9/2003 | Alager et al. ................ 359/110 |

OTHER PUBLICATIONS

M. Sieben, "Optical Single Sideband Transmission At 10Gb/s Using Only Electrical Dispersion Compensation" *Journal of Lightwave Technology*, vol. 17, No. 10, Oct. 1999.

W. Way, "Subcarrier Multiplexed Lightwave System Design Considerations For Subscriber Loop Applications" *Journal of Lightwave Technology*, vol. 7, No. 11, Nov. 1989.

M.M. Ohn, "Dispersion Variable Fibre Bragg Grating Using a Piezoelectric Stack" *Electronic Letters*, vol. 32, No. 21, Oct. 1996.

K. Yonenaga, "Optical Duobinary Transmission System With No Receiver Sensitiivity Degradation" *Electronic Letters*, vol. 21, No. 4, Feb. 1995.

K. Kitayama, "Highly Spectrum Efficient OFDM/PDM Wireless Networks Using Optical SSB Modulation" *Journal of Lightwave Technology*, vol. 16, No. 6, Jun. 1998.

S. Walkin, "Multilevel Signaling For Increaseing The Reach Of 10 Gb/s Lightwave Systems" *Journal of Lightwave Technology*, vol. 17, No. 11, Nov. 1999.

Way, "Broadband Hybrod Fiber Coax Access System Technologies", New York, Academic Press 1998, pp. 253-300.

Smith et al., "Broad-band Millimeter-Wave (38 GHz) Fiber-Wireless Transmission System using Electrical and Optical SSB Modulation to Overcome Dispersion Effects", IEEE Photonics Technology Letters, vol. 10, No. 1, Jan. 1998, pp. 141-144.

Wu et al., "CSO Distortions Due to the Combined Effects of Self and External-Phase Modulations in Long-Distance 1550-nm AM-CATV Systems", IEEE Photonics Technology Letters, vol. 11, No. 6, Jun. 1999, pp. 718-721.

Ramos et al., "Comparison of Optical Single-Sideband Modulation and Chirped Fiber Grating as Dispersion Mitigating Techniques in Optical Millimeter-Wave Multichannel Systems", IEEE Photonics Technology Letters, vol. 11, No. 11, Nov. 1999, pp. 1479-1482.

Yonenaga et al., "Dispersion-Tolerant Optical Transmission System Using Duobinary Transmitter and Binary Receiver", Journal of Lightwave Technology, vol. 15, No. 8, Aug. 1997, pp. 1530-1538.

* cited by examiner

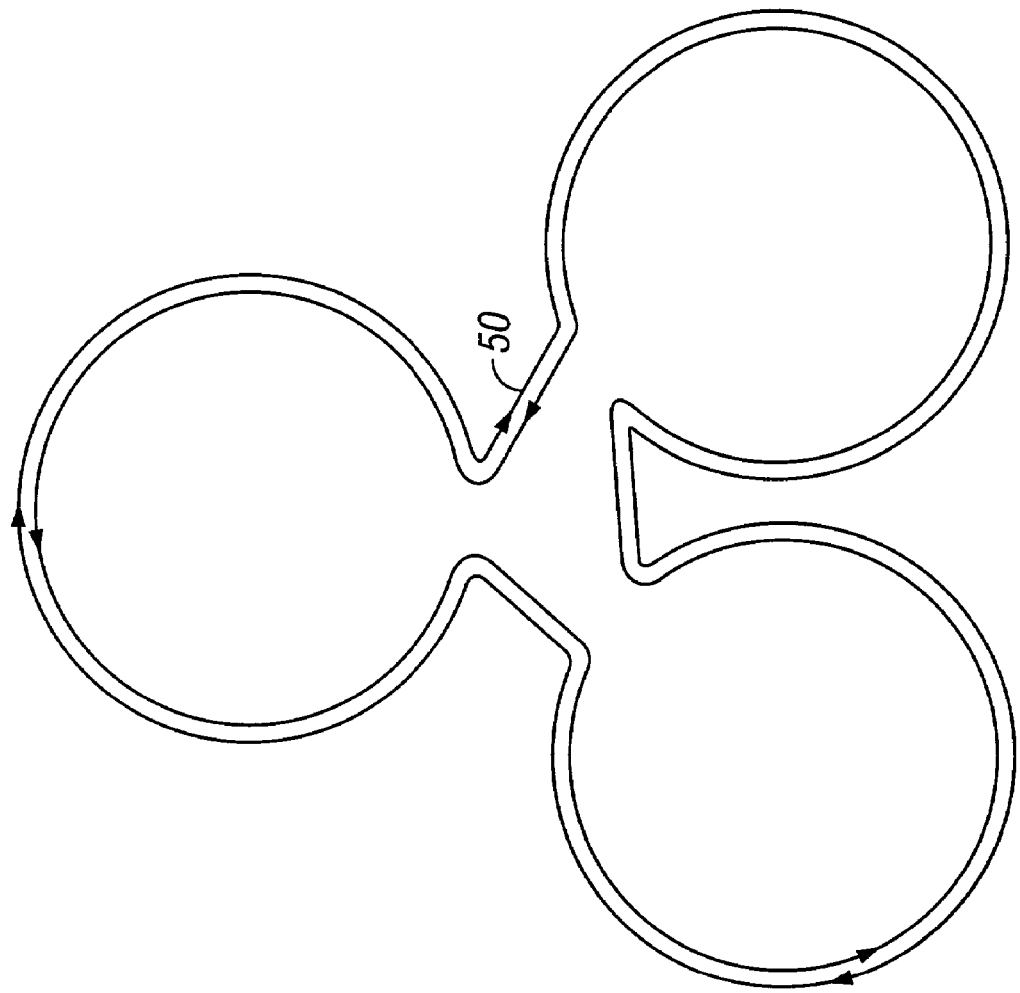
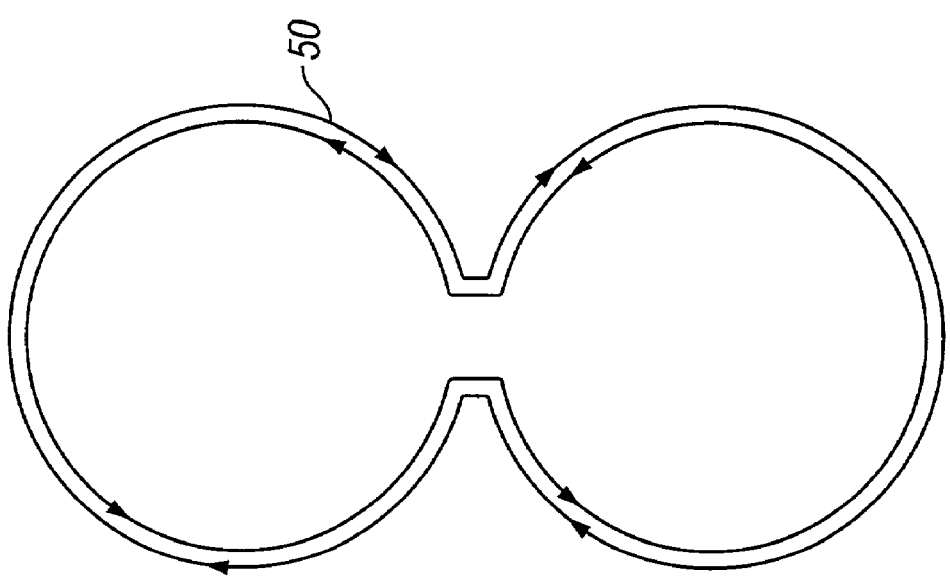
FIG. 10

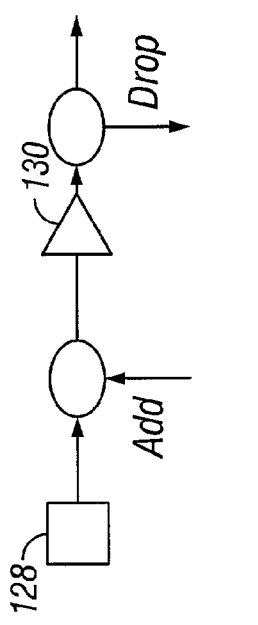
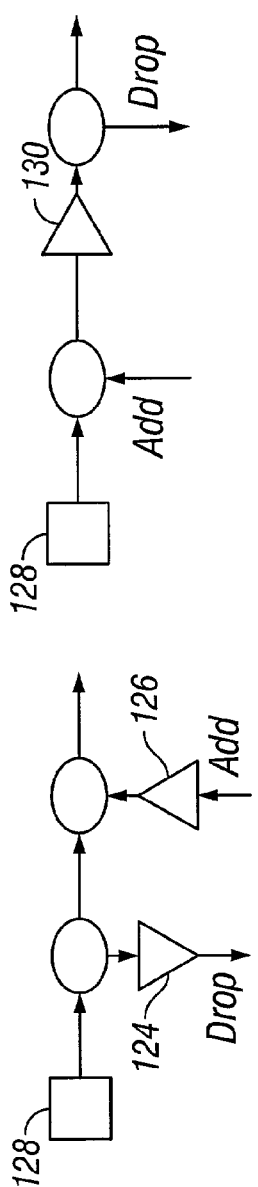
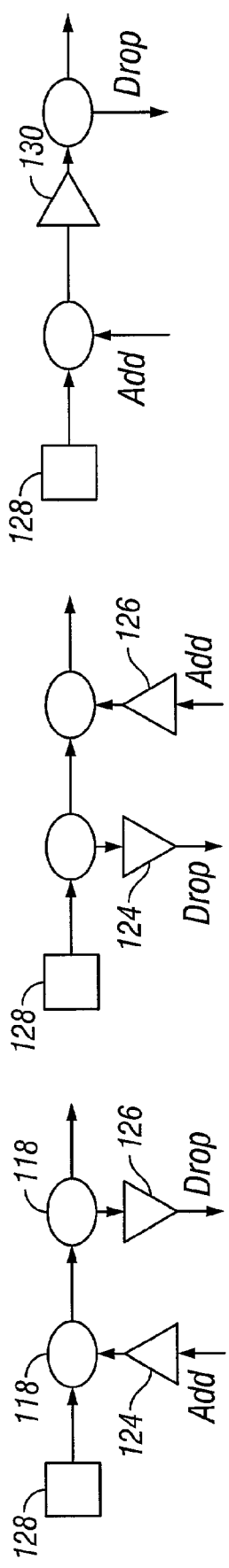
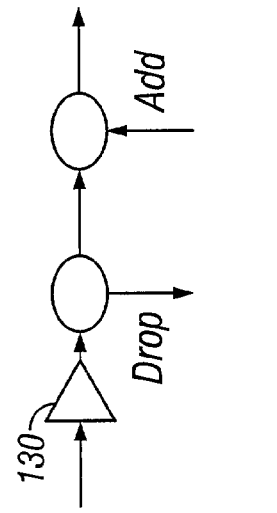
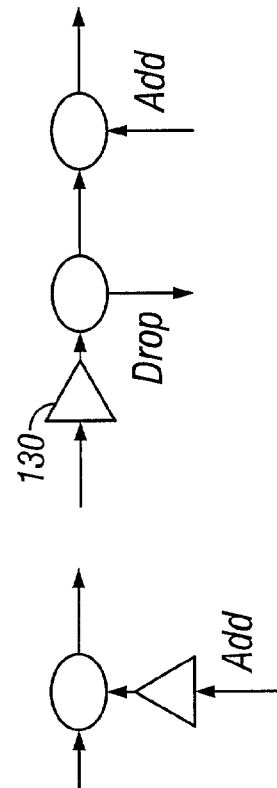
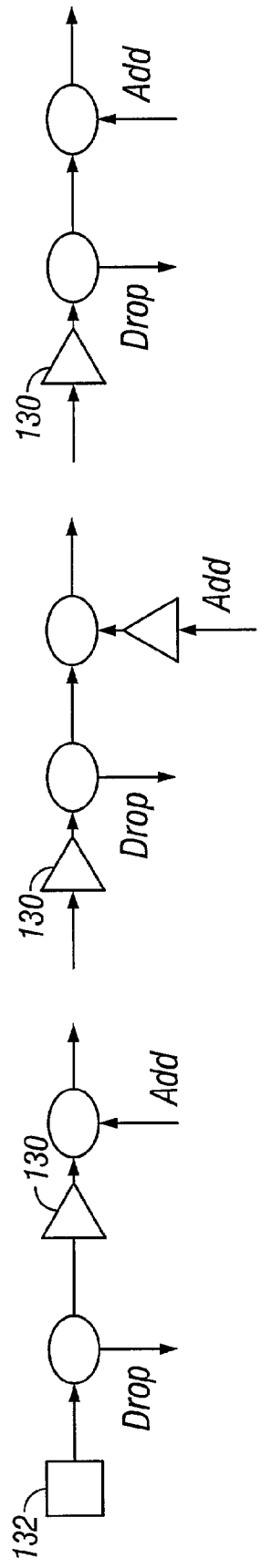
FIG. 15A
FIG. 15B
FIG. 15C
FIG. 15D
FIG. 15E
FIG. 15F

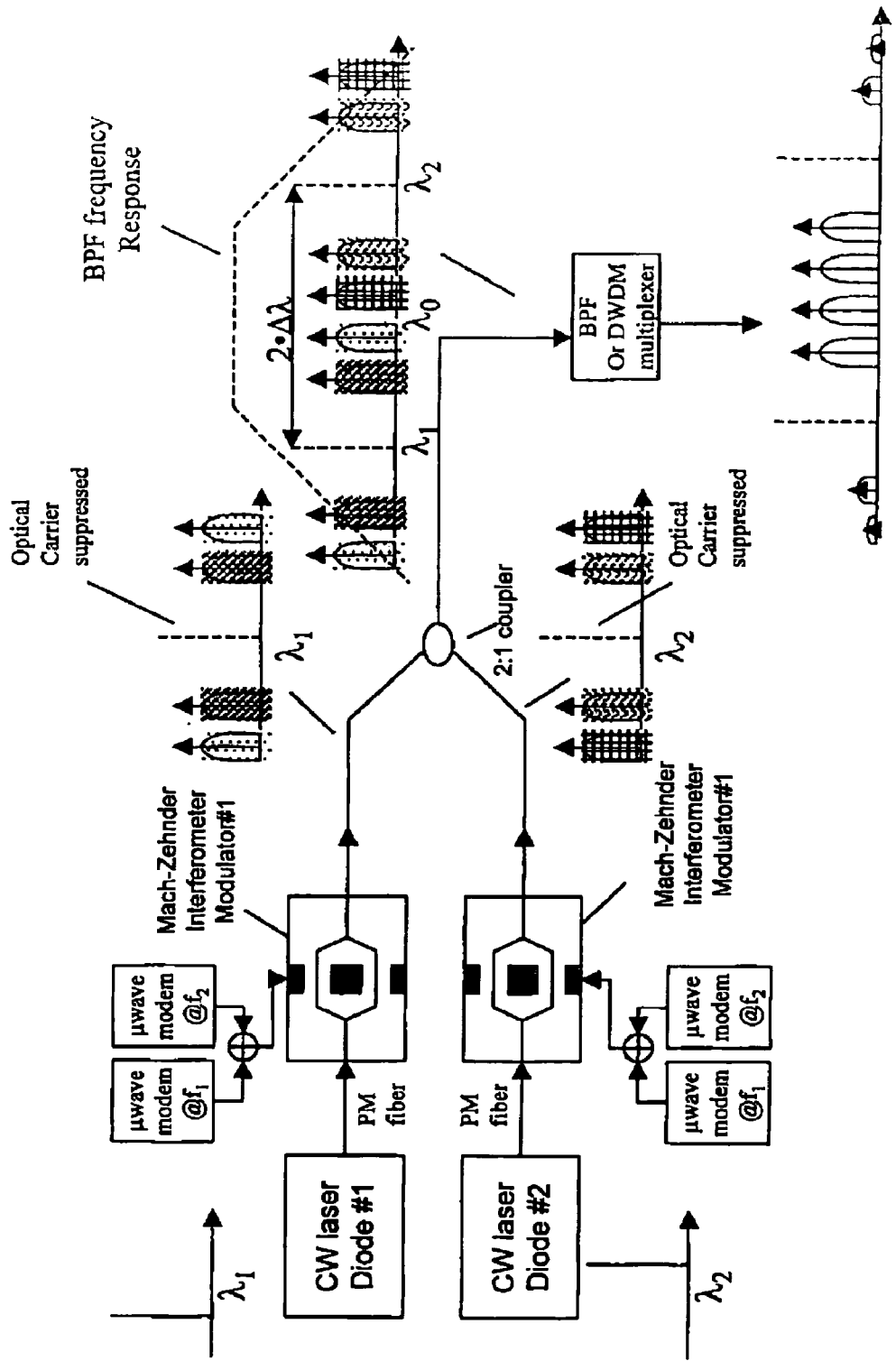

BROADCAST AND SELECT ALL OPTICAL NETWORK

CROSS-REFERENCE TO RELATED APPLICATIONS

This application claims the benefit of U.S. application Ser. Nos. 60/229,784 filed Jun. 20, 2001, 60/301,564 filed Jun. 28, 2001, and 60/309,220 filed Jul. 31, 2001 and is also a continuation-in-part of U.S. Ser. No. 09/990,196 filed Nov. 21, 2001, now U.S. Pat. No. 6,896,184 and of Ser. No. 09/575,811 filed May 22, 2000, now U.S. Pat. No. 6,525,857 all of which applications are fully incorporated herein by reference.

BACKGROUND OF THE INVENTION

1. Field of the Invention

The present invention relates generally to all optical networks, and more particularly to an all optical network that uses broadcast and select and minimizes pass-through losses between rings.

2. Description of the Related Art

In today's long-haul dense-wavelength-division-multiplexed (DWDM) optical networks, multiple regenerators have been replaced by optical amplifiers. However, when interconnecting two or more metro ring networks, or when interconnecting a metro ring with long-haul systems, telecom operators are still relying on regenerators and O-E-O wavelength-converters. Wavelength-converters are needed because conventional DWDM systems do not possess enough wavelengths to cover a wide service area such as multiple interconnected rings, and therefore wavelengths used in one ring must be re-used in another ring via wavelength converters. Regenerators are needed because most of the transmission technologies used in today's metro networks can only support limited transmission distance and data rates.

Conventional ring networks, illustrated in FIGS. 1(a) and 1(b) have a central hub which terminates all the wavelengths by a pair of DWDM mux and demux, an array of O-E-O regenerators, and an electronic cross-connect/switch, such as the one illustrated in FIG. 2. If the central hub in FIG. 2 does not terminate all the wavelengths by DWDM mux/demux and O-E-O regenerators, there is a possibility that the wavelengths may circulate perpetually around the ring especially when excessive amplifications are supplied along the ring. This positive net gain can cause lasing phenomenon and consequently unstable received signals. A solution proposed in U.S. Pat. No. 6,192,173 is that a controlled loss can be added to the ring, and the net round-trip loss should be large enough to prevent the onset of positive feedback but is sufficiently small to allow detection of optical signals to occur with a certain acceptable bit-error-rate. This method makes network control very complicated because adaptive loss control must be provided to different ring sizes and number of nodes, and the system bit-error-rate performance can be degraded.

In FIG. 1(a), wavelength add-drop is carried out by using two optical circulators and a fiber Bragg grating (FBG). The FBG performs the "drop" function by reflecting a wavelength through the first optical circulator. Consequently, when there are two or more wavelengths needed to be dropped, more FBGs are inserted between the two optical circulators, and service disruption is incurred. In FIG. 1(b), dynamic wavelength OADM is implemented in terms of wavelength separation and combination devices (e.g., a DWDM wavelength/band mux/demux pair), together with one or more optical switches—such as 2×2 or N×N devices.

For those wavelengths or bands that should pass through the particular node, the mux and demux pair are connected back-to-back, while for those wavelengths or bands to be dropped and added, there is a 2×2 switch inserted between the mux/demux pair. Depending on the predicted traffic per node, a system planner needs to pre-plan how many 2×2 switches must be placed in advance. This results in two problems, (1) once a fixed number of 2×2 switches are installed, future upgrade to install more switches can cause service disruptions, and (2) if an N×N switch is installed right at the beginning to cover every possible wavelength/band add-drop in the future, its cost will be high. In addition, the N×N switch long-term reliability is still questionable.

Despite the inflexible and non-scalable structure of the OADMs they do offer the wavelength reuse feature, i.e., the added wavelength can be the same as the dropped wavelength. This is a useful feature for ring networks with limited number of available wavelengths.

Another type of optical ring network, illustrated in FIGS. 3(a) and 3(b), uses optical couplers along the main path of the ring network to replace the complicated OADMs. This kind of optical network is a broadcast-and-select optical network, also referred to as a "one-hop" networks, which has been investigated in a DWDM all-optical star (R. Ramaswami and K. N. Sirarajan, *Optical Networks:. a practical perspective*, Morgan, 1998) and proposed in ring networks ("Flexible WDM network architecture", U.S. Pat. No. 6,192,173, April 2001).

In a broadcast-and-select architecture, whenever an optical transmitter launches a wavelength into the network, any user on the ring can receive this message (the "broadcast" characteristic of the network). A receiver receives its desired signal by using either a tunable filter or a fixed filter/demultiplexer (the "select" characteristics of the receiver). A tunable laser can also be used to launch a dynamically tunable wavelength into a fixed optical filter on the receiving end. In either case, the disadvantage is that no wavelength can be re-used. This is because the dropped wavelength will continue to propagate along the rest of the ring network(s), and no other nodes can use the dropped wavelength any more. Consequently, each transceiver card must receive at a specific wavelength, $\lambda_x$, and transmit at another wavelength, $\lambda_y$. This implies the broadcast-and-select network consumes wavelengths twice faster than DWDM networks using conventional OADMs. Most of today's metro-ring optical networks have a limited number of available wavelengths, consequently one cannot afford not to "re-use" the "dropped" wavelengths. Therefore, today's DWDM metro-ring optical network seldom uses broadcast-and-select scheme.

There is a need for a broadcast and select architecture in an all optical fiber ring network. There is a further need for a passive fiber ring network that does not have active elements. Yet there is a further need for an all optical fiber ring network that has minimal fiber ring lasing or coherent cross-talk on the ring. There is still a further need for an all optical fiber ring network that eliminates the need for in-line amplifier gain saturation on the ring. There is another need for an all optical fiber ring network where all wavelength powers are equalized by controlling the launched power of each wavelength.

SUMMARY OF THE INVENTION

Accordingly, an object of the present invention is to provide a broadcast and select architecture in an all optical fiber ring network.

Another object of the present invention is to provide a passive fiber ring network that does not have active elements.

Yet another object of the present invention is to provide an all optical fiber ring network that has minimal fiber ring lasing or coherent cross-talk on the ring.

A further object of the present invention is to provide an all optical fiber ring network that eliminates the need for in-line amplifier gain saturation on the ring.

Still another object of the present invention is to provide an all optical fiber ring network where all wavelength powers are equalized by controlling the launched power of each wavelength.

These and other objects of the present invention are achieved in an all optical network for optical signal traffic. A first ring is included that has at least one transmitter and one receiver. The first ring includes a plurality of network nodes. At least a first add/drop broadband coupler is coupled to the first ring. The broadband coupler includes an add port and a drop port to add and drop wavelengths to and or from the first ring, a pass-through direction and an add/drop direction. The first add/drop broadband coupler is configured to minimize a pass-through loss in the first ring and is positioned on the first ring.

Various examples and implementations are described in this application, including the following examples for all optical networks.

1. An all optical network for optical signal traffic includes a first ring and at least a first add/drop broadband coupler. The first ring includes least one transmitter and one receiver, a plurality of network nodes.

The first add/drop broadband coupler is coupled to the first ring and is configured to minimize a pass-through loss in the first ring. The broadband coupler is positioned on the first ring and includes an add port and a drop port to add and drop wavelengths to and or from the first ring, a pass-through direction and an add/drop direction.

2. The network of above item number 1, wherein the first add/drop broadband coupler includes a booster configured to compensate for add/drop loss on the first ring.

3. The network of above item number 1, wherein the first add/drop broadband coupler includes a pre-amplifier configured to compensate for add/drop loss on the first ring.

4. The network of above item number 1, wherein the first add/drop broadband coupler includes an in-amplifier configured to compensate for add/drop loss on the first ring.

5. The network of above item number 1, wherein the first ring includes a plurality of nodes.

6. The network of above item number 4, wherein the a number of the plurality of nodes is in the range of 3 to 20 nodes 7. The network of above item number 1, wherein the first ring has a circumference in the range of 5 to 1000 km.

8. The network of above item number 1, wherein the network is a passive optical network without in-line optical amplifiers.

9. The network of above item number 1, wherein the broadband coupler includes at least a first 1×2 coupler to add traffic and a second 1×2 coupler to drop traffic.

10. The network of above item number 1, wherein the network is a non-passive network with at least one in-line optical amplifier.

11. The all optical network of above item number 10, wherein the first ring includes at least a first working fiber and a first protection fiber that carries all of the optical signal traffic, wherein optical signal traffic travels in a clockwise direction in the first working fiber and in a counter-clockwise direction in the first protection fiber.

12. The network of above item number 10, further comprising:
at least one 1×1 or 1×2 switch coupled to the first working fiber, and at least one 1×1 or 1×2 switch coupled to the first protection fiber.

13. The all optical network of above item number 12, wherein each 1×1 or 1×2 switch is maintained in an open position when there is no break point in the first ring, and each 1×1 or 1×2 switch is closed upon an occurrence of a break point in the first ring.

14. The of above item number 10, wherein an open 1×1 switch is maintained on the first ring to eliminate a fiber ring basing phenomenon in response to gain provided by an in-line amplifier coupled to the first ring.

15. The network of above item number 1, further comprising:
an all-optical hub that couples the first ring to at least a second ring.

16. The network of above item number 15, wherein the all-optical hub separates optical signals in each ring into wavelength bands, wherein a number of wavelength bands is equal to a number of rings in the network that are coupled together.

17. The network of above item number 16, wherein the all-optical hub includes at least one 1×N band-splitter and an N×1 coupler that couples optical signal traffic among rings coupled together on the network, wherein N is the number of rings coupled together.

18. The of above item number 17, wherein the 1×N band splitter optical traffic that originates from one ring to one or more different rings in response to its wavelength band.

19. The network of above item number 18, wherein the N×1 coupler is configured to launch to any selected ring in the network the wavelength bands from the other rings in the network.

20. The network of above item number 1, further comprising:
a loss pad that maintains at least 25 dB round-trip traveling loss around the first ring.

21. The network of above item number 1, wherein the loss pad is configured to minimize coherent crosstalk from re-circulated signals.

22. The network of above item number 1, further comprising:
at least a first and a second wavelength-dependent three-port add-drop filter coupled to each network node.

23. The network of above item number 22, wherein the first wavelength-dependent three-port add-drop filter is configured to add signal traffic in an add direction; and the second wavelength-dependent three-port add-drop filter is configured to drop traffic in a drop direction.

24. The network of above item number 23, wherein the first and second wavelength-dependent three-port add-drop filters are positioned off the first ring.

25. The network of above item number 1, further comprising:
a first three-port add-drop filter coupled to the first ring in the add/drop direction, the first three-port add-drop filter including an input port and a drop port.

26. The network of above item number 1, further comprising:

a plurality of wavelength-dependent three-port add-drop filters configured to be cascaded at each node for the drop direction to drop multiple wavelengths, and cascaded for the add direction to add multiple wavelengths.

27. The network of above item number 26, wherein the plurality of wavelength-dependent three port add-drop filters are positioned off the first ring.

28. The network of above item number 1, further comprising:

a least a fist expansion module coupled to the first ring that adds and drops more than one wavelength.

29. The network of above item number 28, wherein the first expansion module includes one or more cascaded three-port optical add/drop filters and a plurality of multiplexed transmitters for adding wavelengths.

30. The network of above item number 28, wherein wavelengths added are different from wavelengths that are dropped.

31. The network of above item number 28, wherein the first expansion module includes an array of parallel filters for dropping wavelengths, and an array of multiplexed transmitters for adding wavelengths.

32. The network of above item number 31, wherein the wavelengths added are different from wavelengths that are dropped.

33. The network of above item number 1, wherein the drop port includes a wavelength-dependent tunable filter.

34. The of above item number 33, wherein the tunable filter is configured to reflect non-selected wavelengths to a through port for one cascaded three-port optical add/drop filter to an adjacent cascaded three-port optical add/drop filter.

BRIEF DESCRIPTION OF THE DRAWINGS

FIG. 10 illustrates that multiple rings can be interconnected in a manner such that they appear to be a single ring.

FIGS. 15(a) through 15(f) illustrate various arrangements of an in-line amplifier, booster amplifier and optical fiber couplers in the various nodes that can be utilized with the all optical network of FIG. 14.

DETAILED DESCRIPTION OF THE PREFERRED EMBODIMENTS

In one embodiment of the present invention, methods are provided for transmitting optical signal traffic. An all optical network is utilized with at least two rings that are geographically dispersed. Each ring has at least one transmitter and receiver. A sufficiently large enough number of wavelengths is shared in both rings to achieve the sharing without O-E-O conversions between the rings. Alternatively, the available wavelengths are separated into distinct ring bands. The optical signal traffic is shared throughout the entire optical network. Each ring is provided with its own distinct ring band of the optical signal traffic. All of the optical signal traffic is transmittable throughout the optical network. Each receiver is configured to receive only wavelengths in a ring band designated for its associated ring.

The present invention also provides all optical networks for optical signal traffic. In one embodiment the all optical network has at least first and second rings. Each ring has at least one transmitter and receiver and its own distinct ring band of the optical signal traffic. All of the optical signal traffic is transmittable throughout the entire all optical network. Each receiver is configured to receive only wavelengths in a ring band designated for its associated ring. A central hub couples the first and second rings and separates the optical signal traffic into ring bands.

In another embodiment of the present invention, an all optical network includes a first ring with at least first and second protection fibers that carry all of the optical signal traffic. The optical signal traffic travels in a clockwise direction in the first protection fiber and in a counter-clockwise direction in the second protection fiber. At least one 1×1 or a 1×2 switch is coupled to each first and second protection fiber. The 1×1 or 1×2 switch is maintained in an open position when there is no break point in the ring and closed upon an occurrence of a break point in the ring.

Figure 4A:
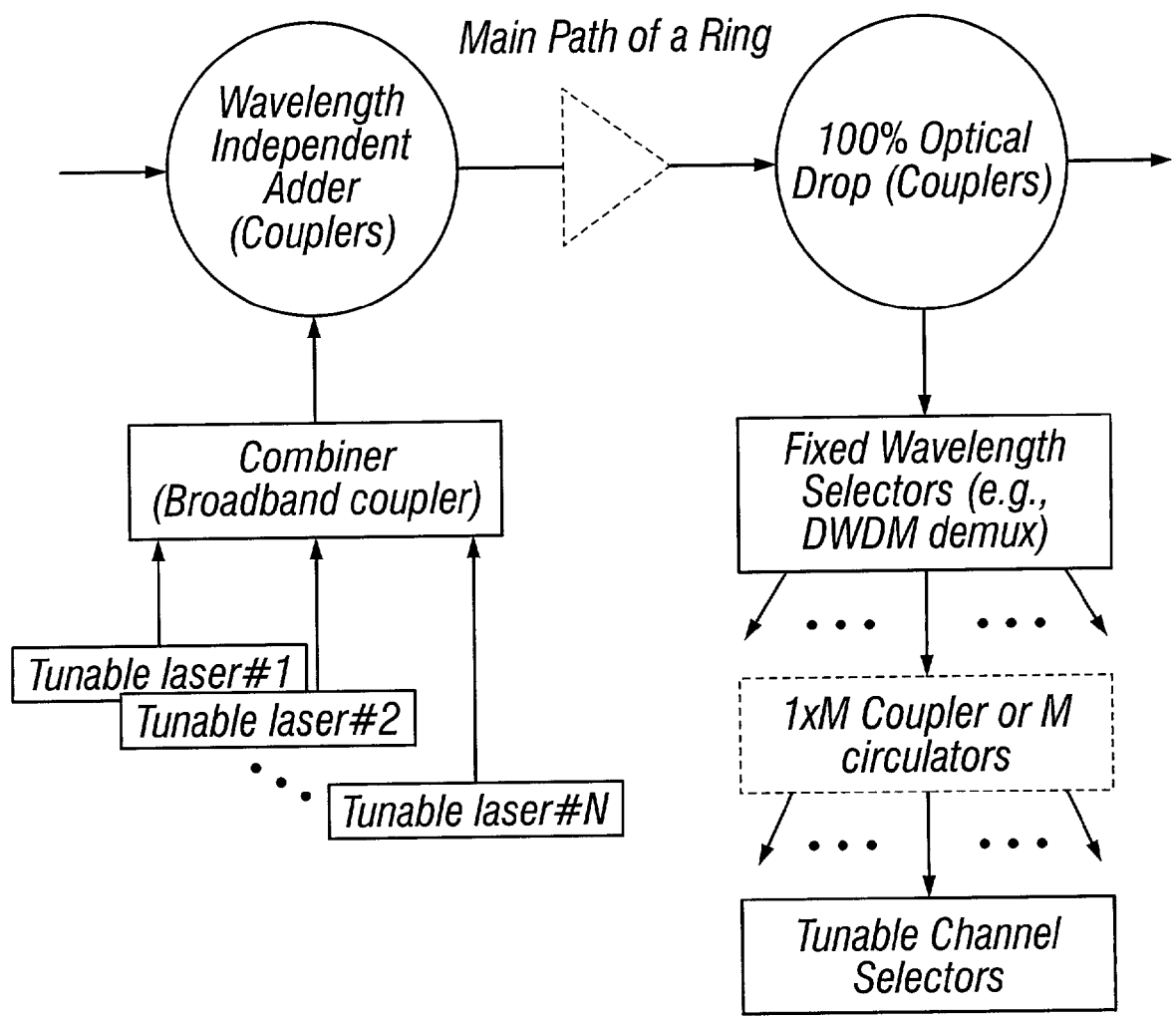
FIG. 4(a) illustrates one embodiment of a wavelength-add-drop hierarchy.
Figure 4B:
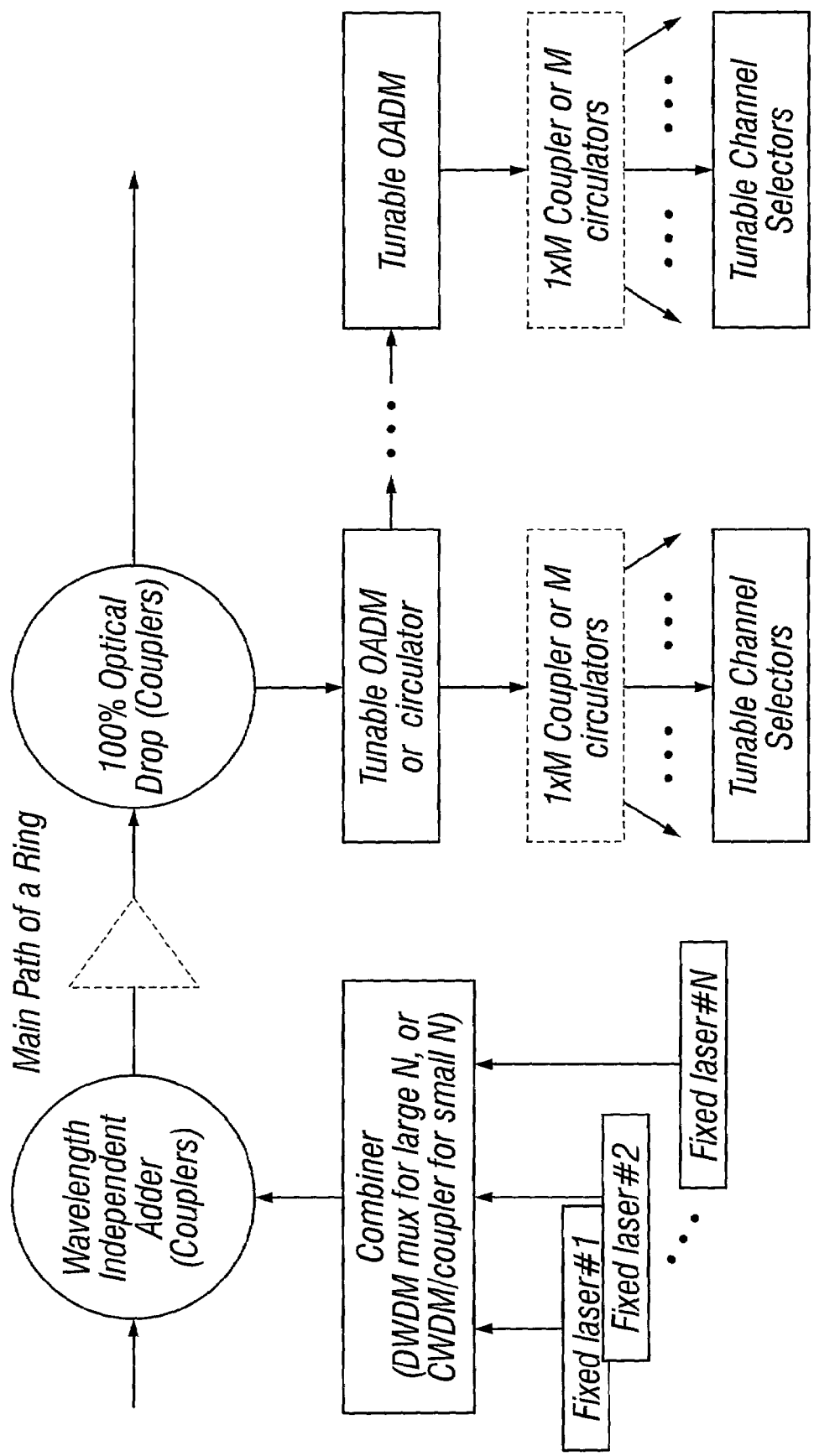
FIG. 4(b) illustrates another embodiment of a hierarchical wavelength add-drop.

With the methods and networks of the present invention, various arrangements of in-line amplifiers, booster amplifiers and optical fiber couplers in each node can be used, such as those illustrated by way of example and without limitation in FIGS. 4(a) through (c).

FIG. 4(a) illustrates one example of a wavelength-add-drop hierarchy. As shown, along the main path of the ring network only broadband couplers, and possibly optical amplifiers, are used. On the addition side, an array of tunable lasers are added through an optical coupler. On the drop side, a fixed wavelength demultiplexer or an optical filters is located after a main-path coupler. Following the demultiplexer or optical filter an optional 1×M optical splitter and M tunable optical filters can be included. Each is utilized to extract a sub-wavelength channel.

FIG. 4(b) illustrates another example of a hierarchical wavelength add-drop. As shown, along the main path of the ring network only broadband couplers, and possibly optical amplifiers, are used. On the addition side, an array of N fixed lasers are added through a DWDM multiplexer, for a large N, through a CDWM multiplexer or an optical coupler for a small N. On the drop side, a tunable wavelength OADM is located after the main-path coupler. Following the demultiplexer or optical filter is an optional 1×N optical splitter and N tunable optical filters. These extract a sub-wavelength channel.

Figures 1A, 1B, 5:
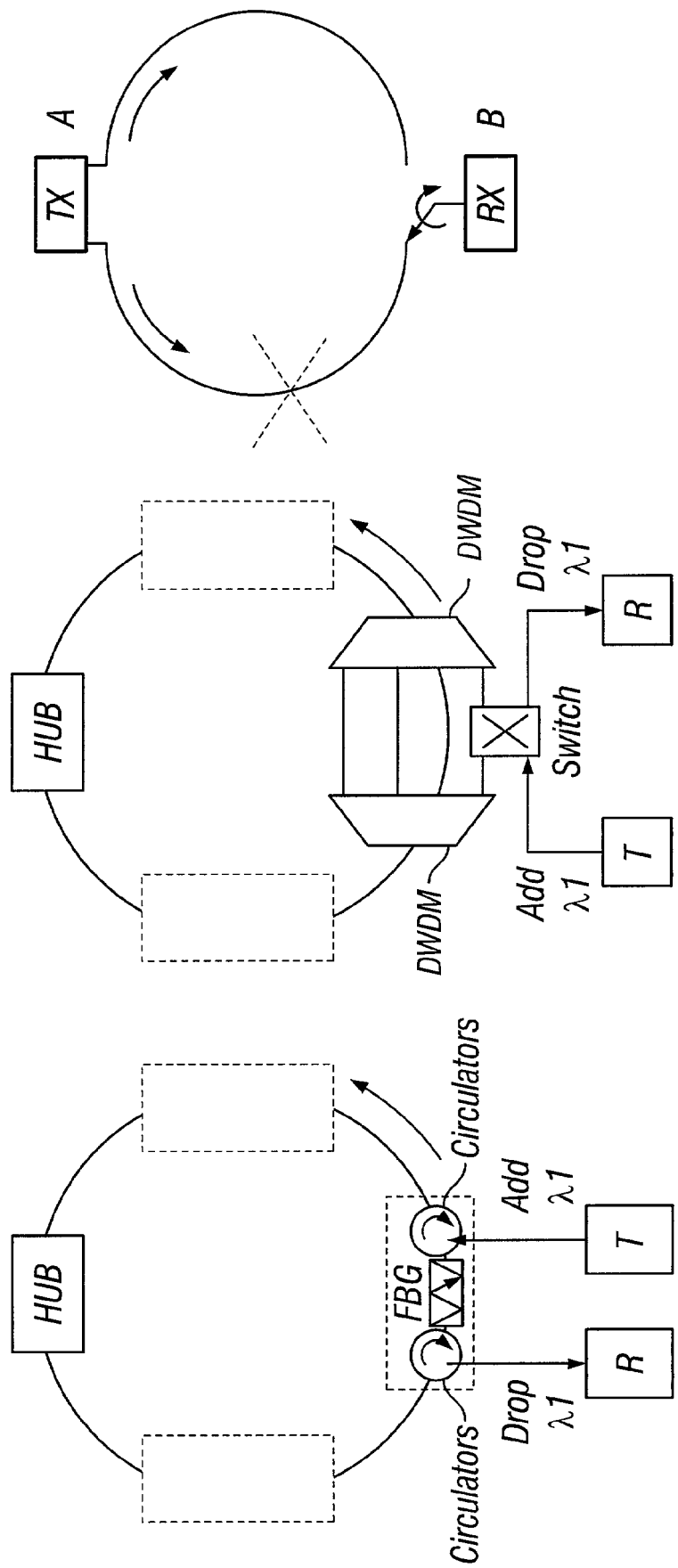
FIG. 1(a) is a schematic diagram of the conventional OADM that is placed in the main path of the ring network for OADM using Bragg grating.
FIG. 1(b) is a schematic diagram of the conventional OADM that is placed in the main path of the ring network for OADM using DWDM mux/demux and optical switches.
FIG. 5 is a diagram of a conventional SONET unidirectional protection switching ring (UPSR).

FIG. 5 is included to illustrate a conventional SONET uni-directional protection switching ring (UPSR) that can be used with the methods and networks of the present invention.

Figure 6:
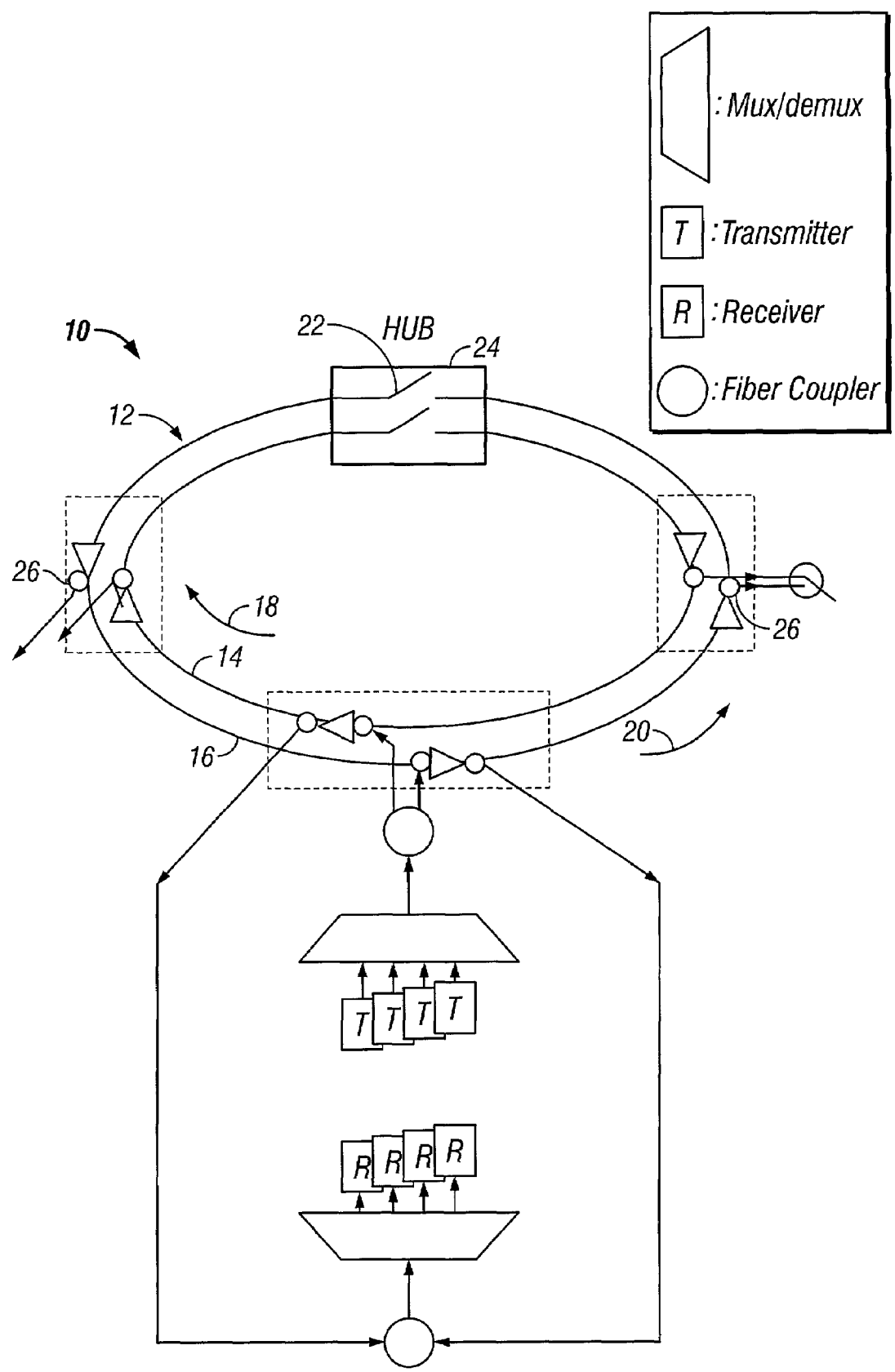
FIG. 6 illustrates one embodiment of a two-fiber broadcast-and-select ring architecture of the present invention, with a pair of 1×1, or 1×2 switches in the central hub.

One embodiment of the present invention, illustrated in FIG. 6, is an all optical network 10 with a first ring 12 that has at least first and second protection fibers 14 and 16 that carry all of the optical signal traffic of network 10. Optical signal traffic travels in a clockwise direction 18 in first protection fiber 14 and in a counter-clockwise direction 20 in second protection fiber 16. At least one 1×1 or 1×2 switch 22 is coupled to first and second protection fibers 14 and 16 in a central hub 24 or at any nodes 26 of network 10. Switch 22 is open under normal conditions and a break point is maintained in ring 12. A perpetual re-circulating of optical signal traffic is prevented. Each node includes one or more transmitters and receivers, mux/demux and fiber coupler. Every transmitter in network 10 launches its signal in both first and second fibers 14 and 16. Because of the break point in central hub 24 only one of these duplicated signals can be received at a destination. The break point in central hub 24 also prevents the two duplicated signals arriving at the same destination in which case the two signals may be combined destructively, they may be 180° out of phase.

Figure 7A:
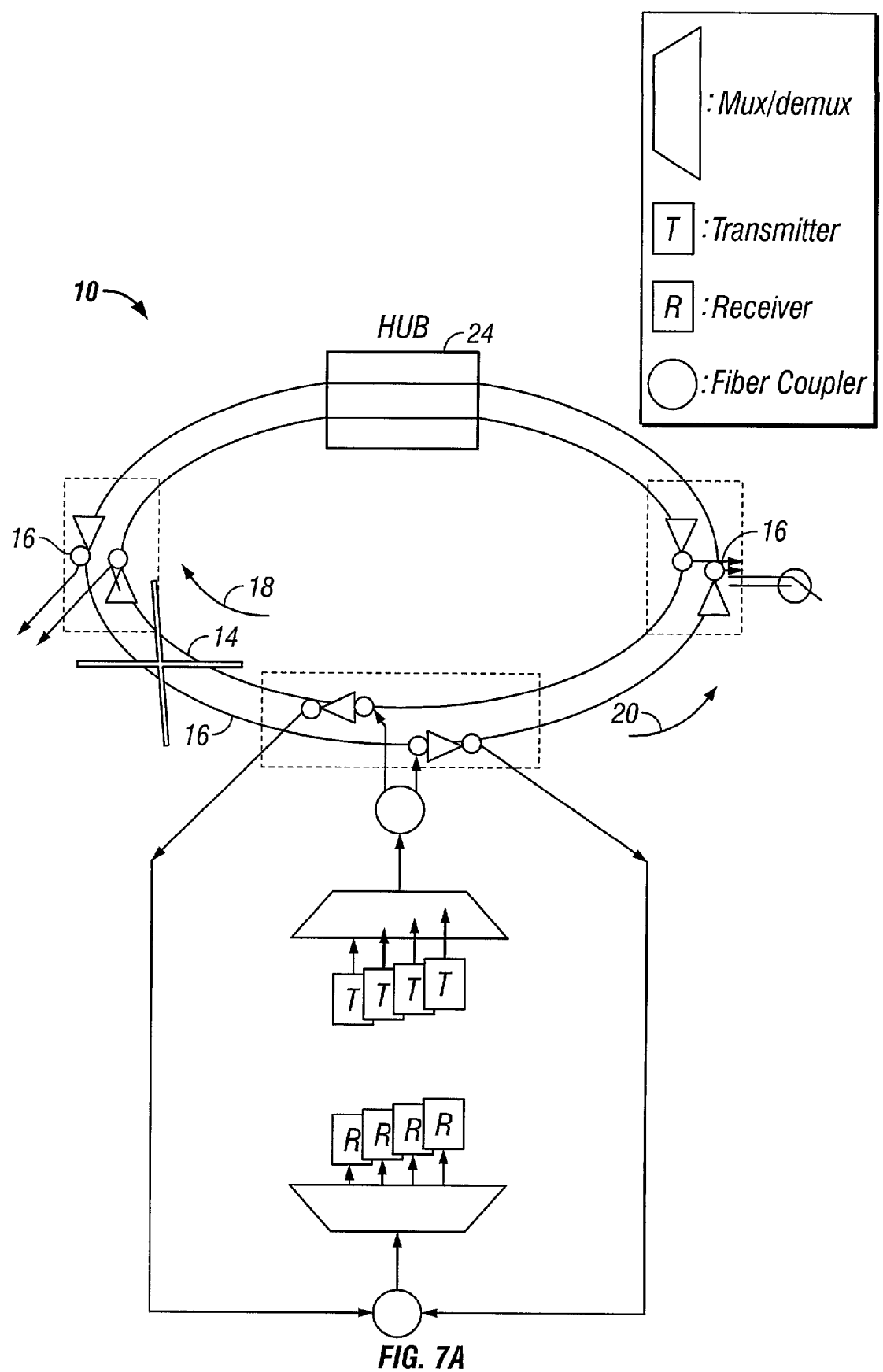
FIG. 7(a) illustrates operation of protection switches in the central hub and nodes of the FIG. 6 embodiment when both fibers break.
Figure 7B:
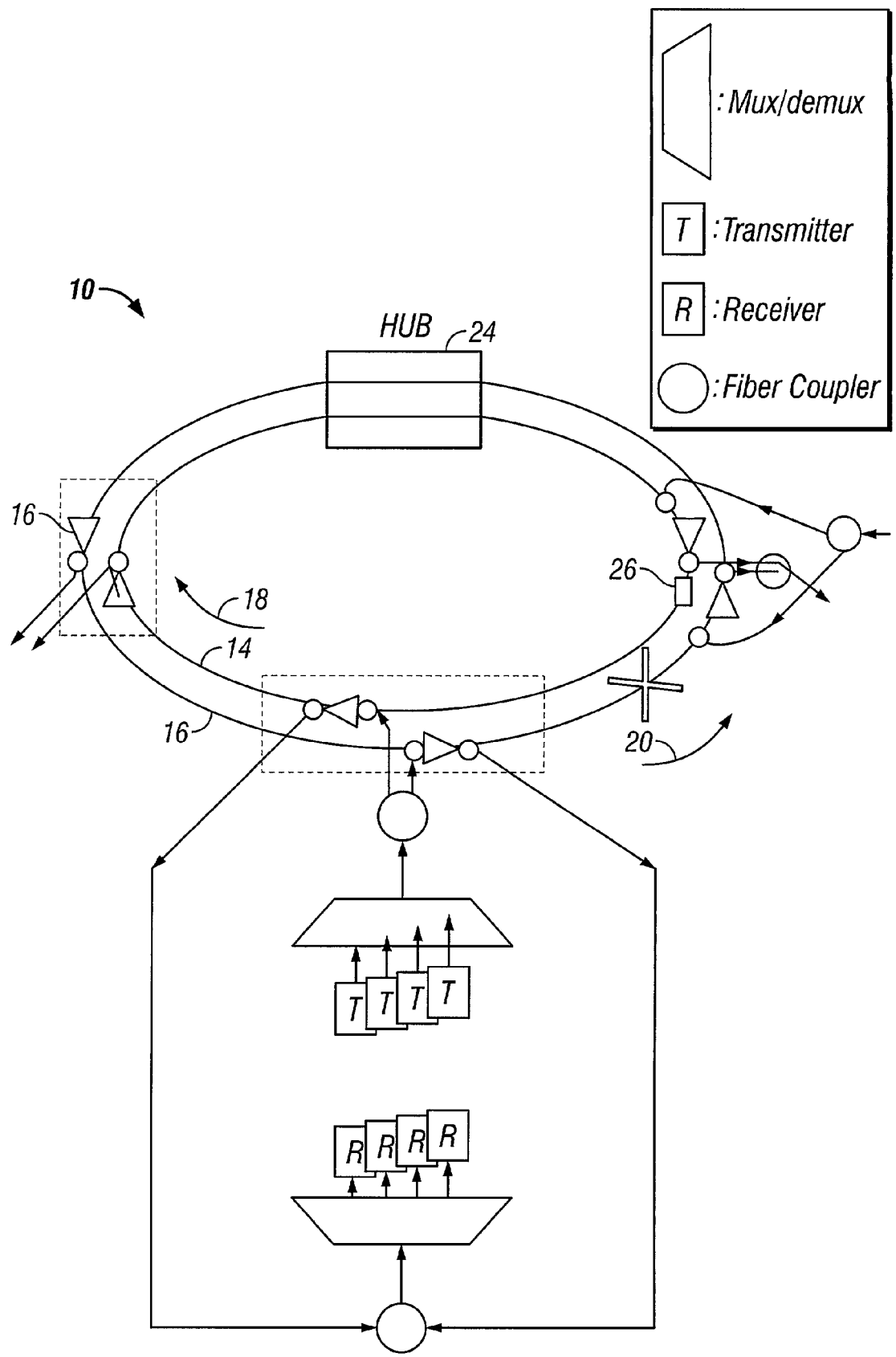
FIG. 7(b) illustrates operation of protection switches in the central hub and nodes of the FIG. 6 embodiment when a single fiber breaks.

When there is a broken fiber in network 10, as shown in FIG. 7(a), a new break point is created. The old break point in hub 24 is immediately closed for both first and second protection fibers 14 and 16. Several other fiber or optical amplifier break conditions can also be protected by turning on and off the pair of 1×1 switches, as illustrated in FIGS. 7(b) through 7(c).

In FIG. 7(a), both first and second fibers 14 and 16 are broken. In FIG. 7(b), there is a failure in a single optical amplifier, and optical switch 26 is open to ensure that there is a break point in the clock-wise working ring. In FIG. 8(c) a failure exists in one optical amplifier. Optical switches 28 and 30 are switched in order to let launched signal bypass the failed in-line amplifier. Optical switch 32 is switched to open position to ensure that there is a break point in the clock-wise ring. In a normal operating condition, without a break or failure of a fiber or an amplifier, the transmitted signal arrives at the receiver in direction 18 or direction 20 but not in both.

Figure 7C:
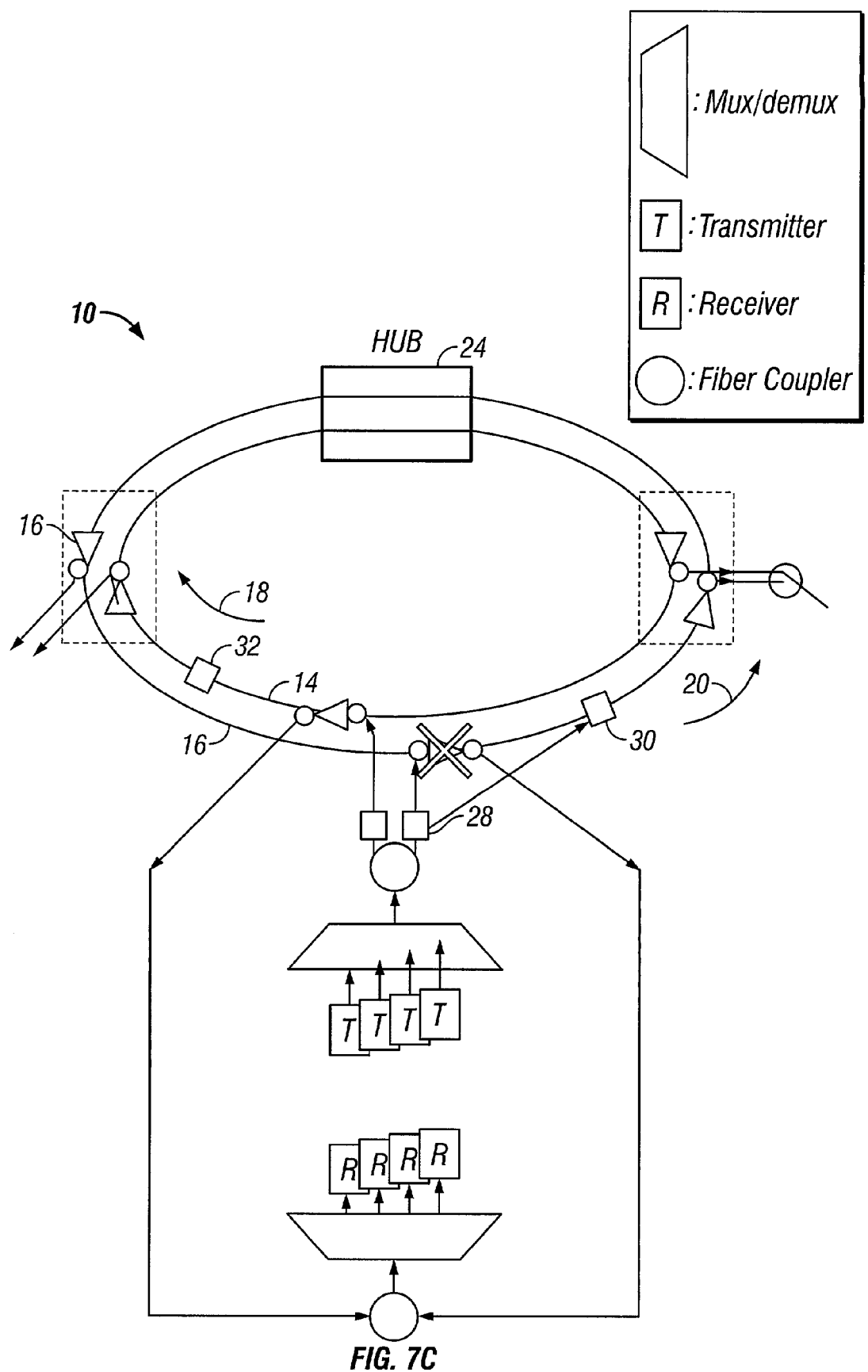
FIG. 7(c) illustrates operation of protection switches in the central hub and nodes of the FIG. 6 embodiment when a single optical amplifier fails.
Figure 8:
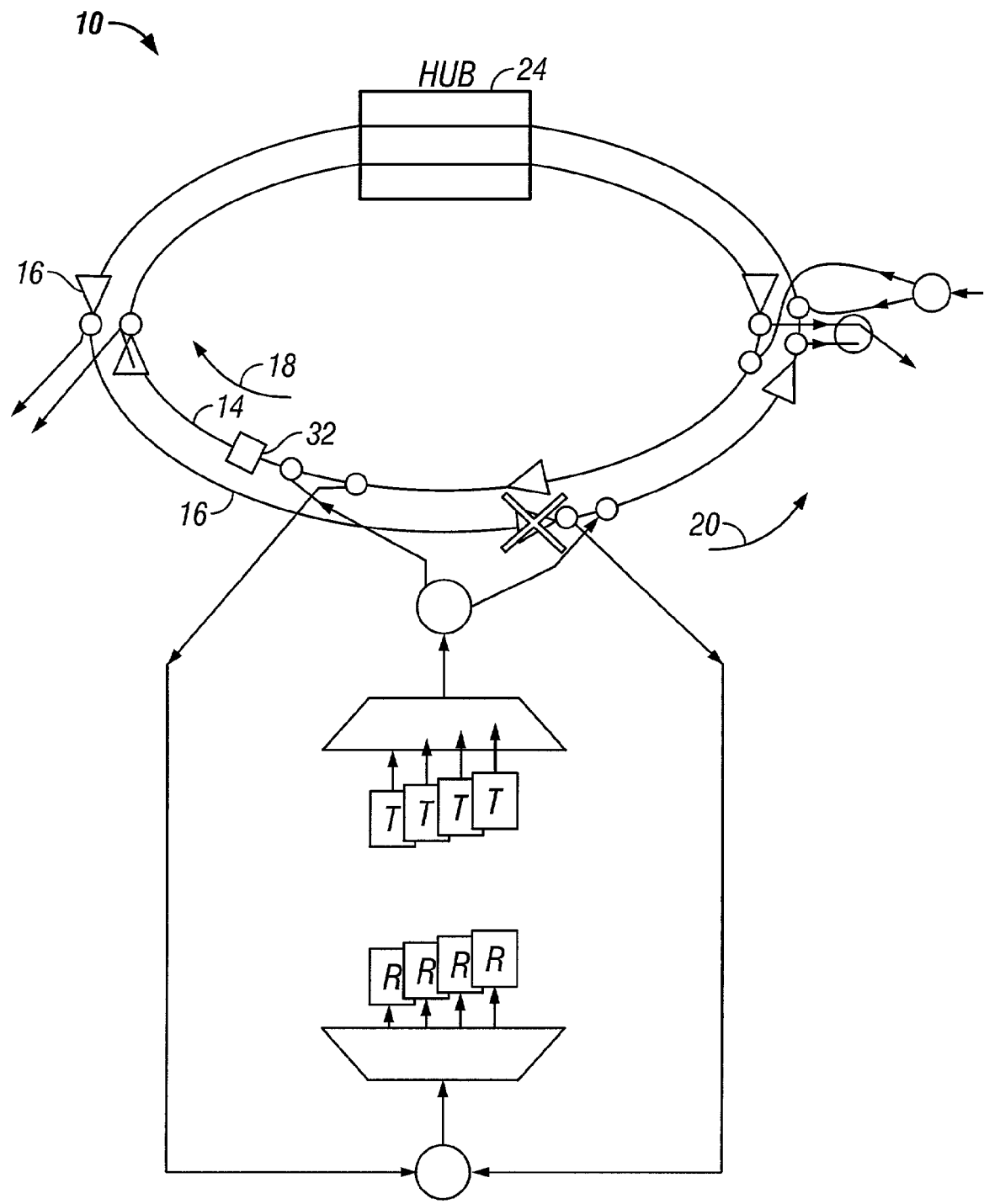
FIG. 8 illustrates operation of protection switches in the central hub and a node when a single optical amplifier fails.

In another embodiment of the present invention, illustrated in FIG. 8 only one switch 32 needs to be turned open to perform the same protection as that in FIG. 7(c).

Figure 9A:
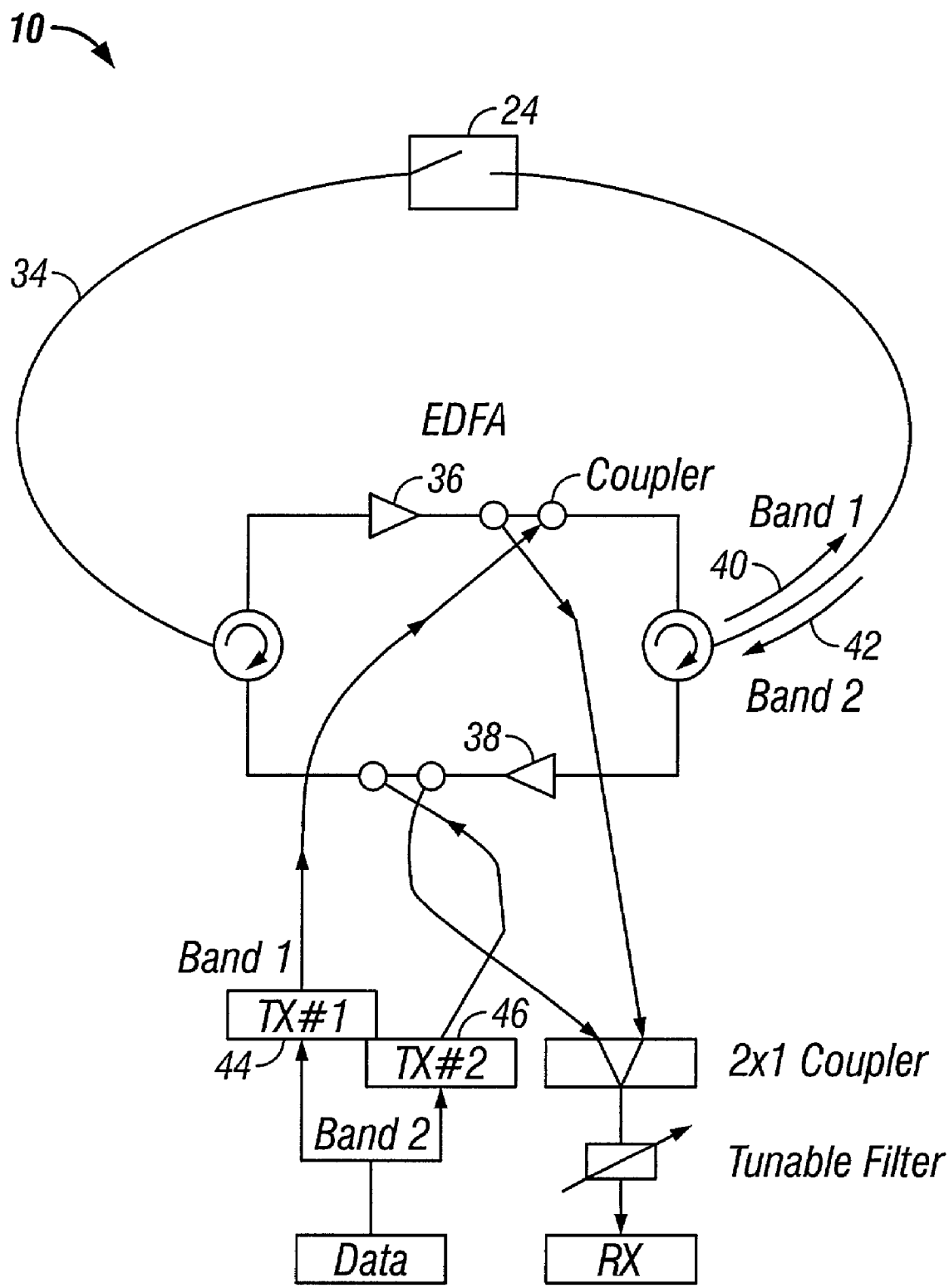
FIGS. 9(a) through (e) illustrate an alternative protection ring design when using a single optical fiber with east-bound traffic in one band, and west-bound traffic in another band.

In other embodiments of the present invention, a single fiber 34 is used instead of dual fibers, as illustrated in FIGS. 9(a) through (e). In the FIG. 9(a) through (e) embodiments each node has two optical amplifiers 36 and 38 arranged in such a condition that each one amplifies a band of optical signals and is oriented toward opposite directions. The same data is duplicated in the two bands 40 and 42 by using either two optical transmitters 44 and 46, as shown in FIGS. 9(a), or by using a single transmitter 18 transmitting duplicated signals in different frequencies (wavelengths), as shown in FIG. 9 (d). The receiver in each node can select either of the two bands, which come from different directions along the ring, by using a tunable filter which can tune from one band to the other.

Figure 9B:
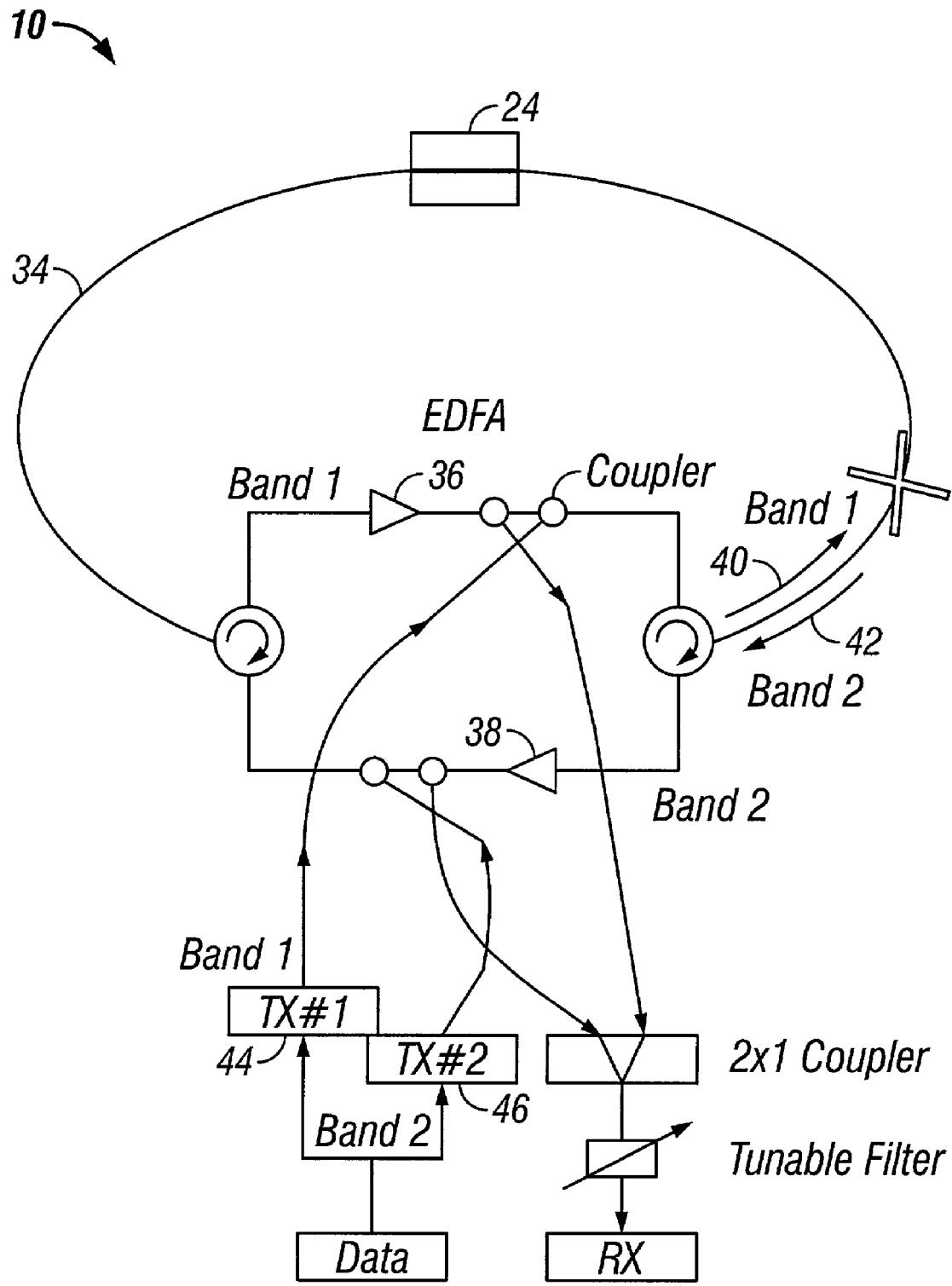
Figure 9C:
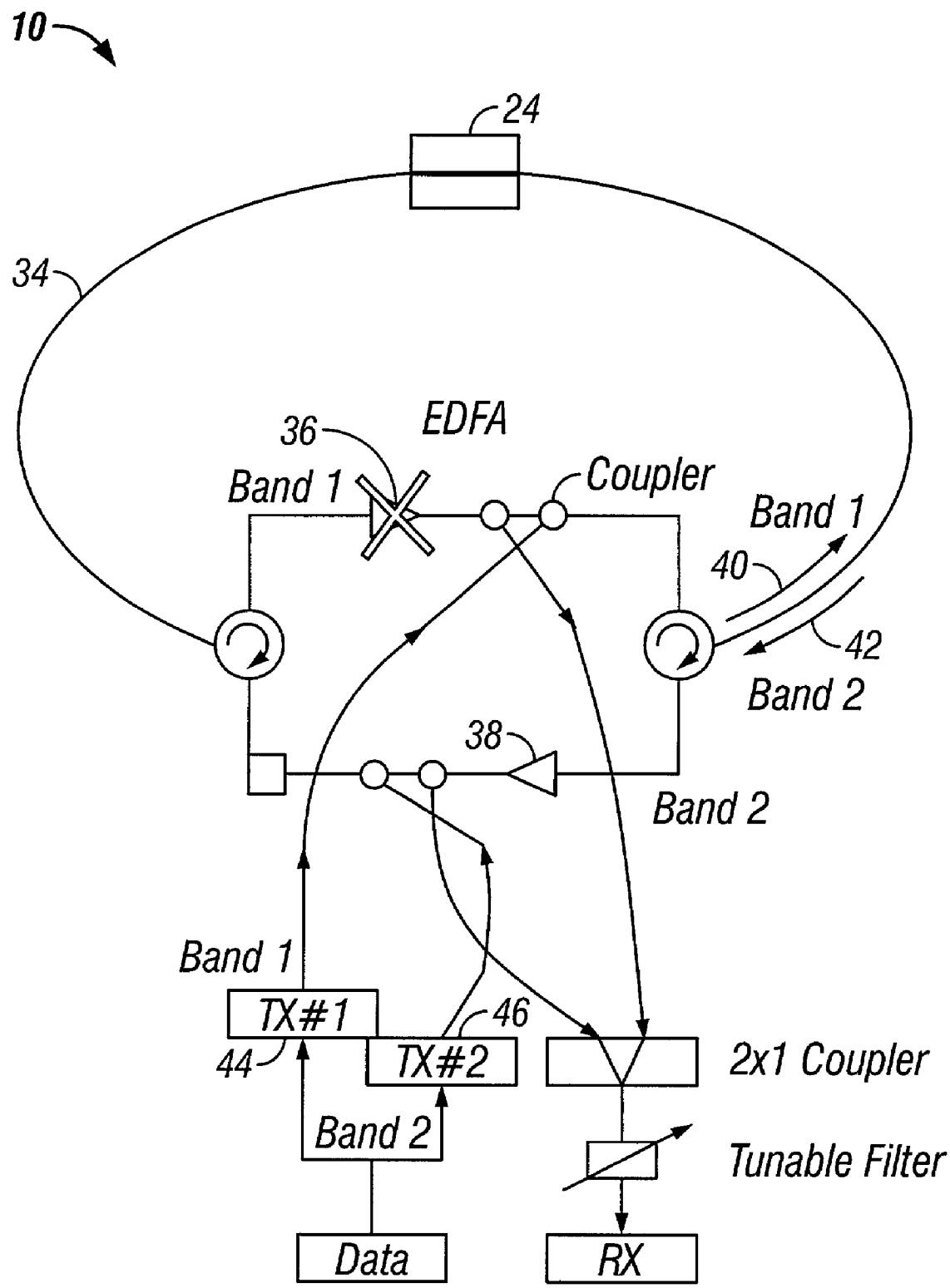
Figure 9D:
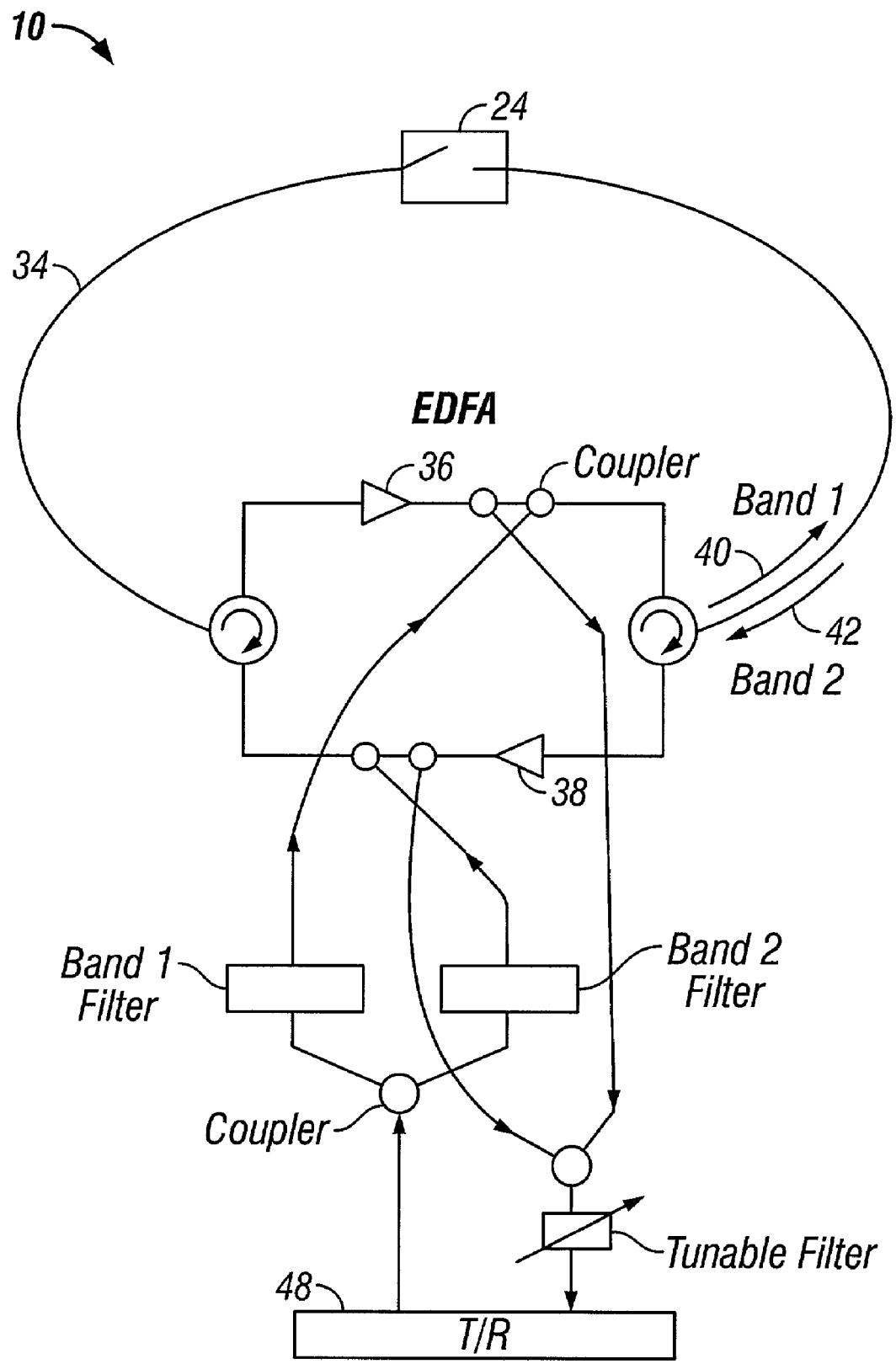
Figure 9E:
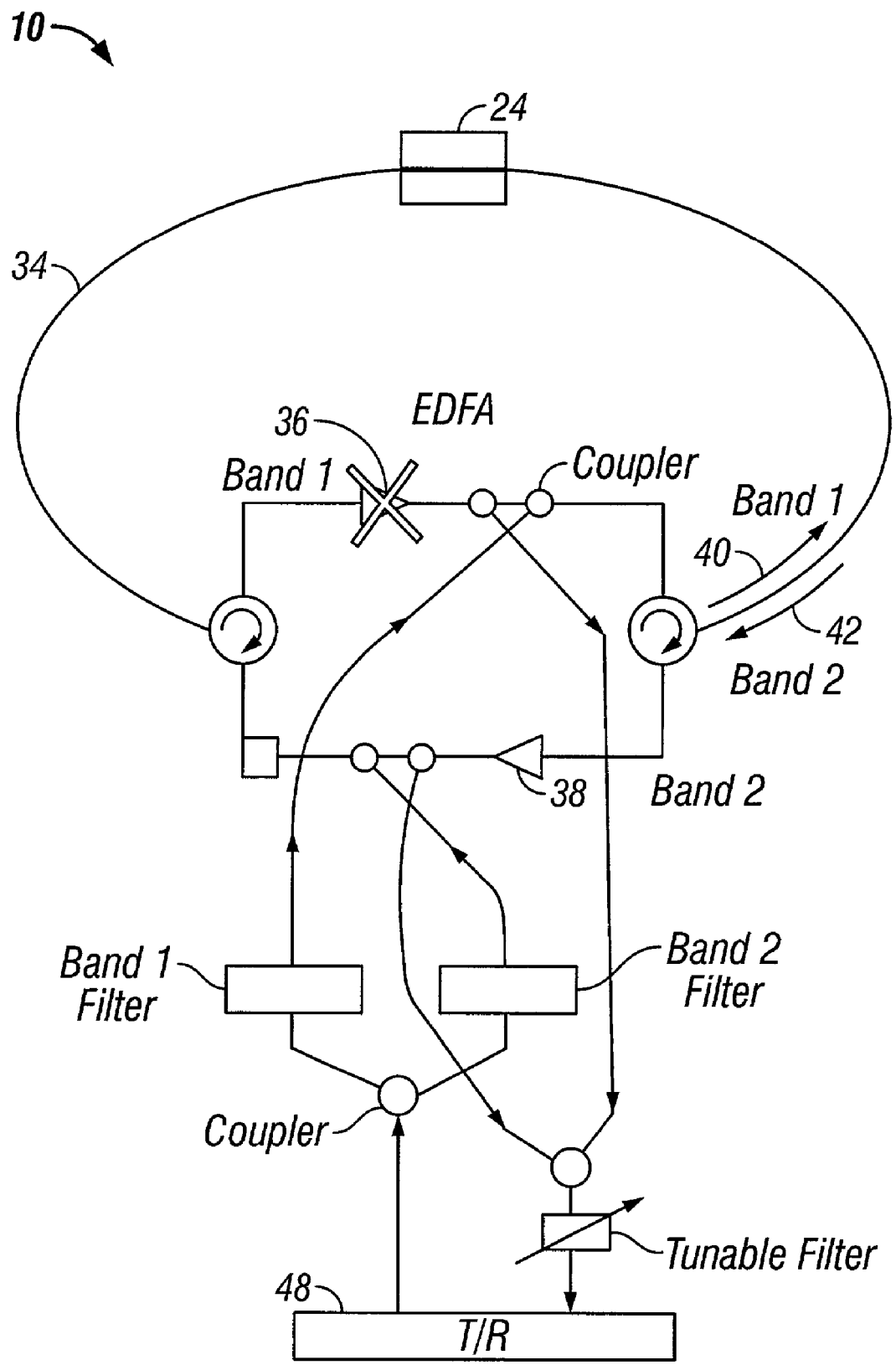

When there is a fiber break or amplifier failure, the operation principle is the same as that of dual-fiber rings, as illustrated in FIGS. 9(b), (c), and (e).

Ring to ring interconnection can be achieved by breaking the rings and interconnecting them to form a single ring 50, as illustrated in FIG. 10.

The FIG. 10 embodiment forces each in-line amplifier in each node to amplify all wavelengths traveling along the ring, even though the wavelengths were not intended for that particular node. This can increase the cost of optical amplifiers.

Figure 11:
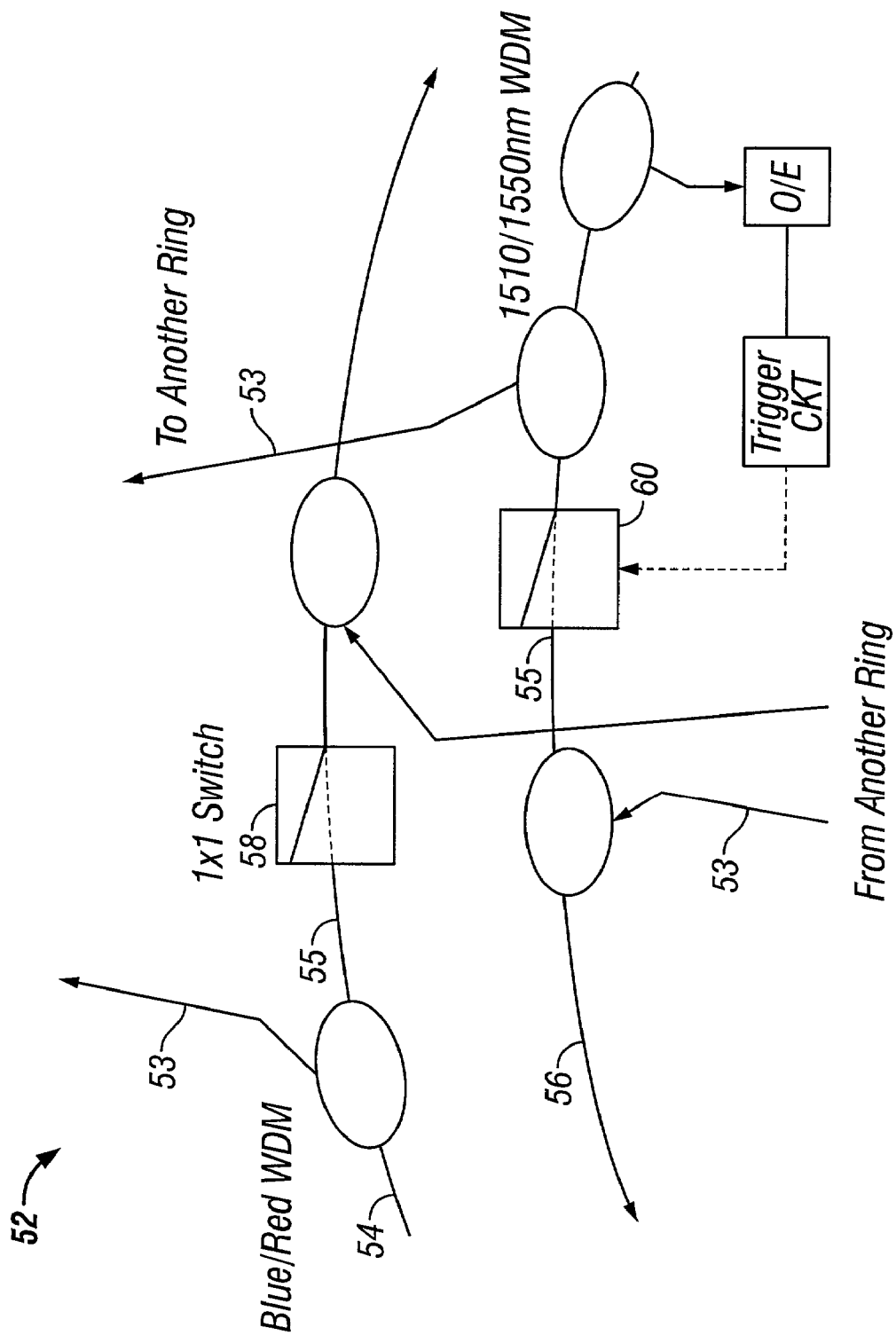
FIG. 11 illustrates a central hub construction without O-E-O conversions for interconnecting two ring networks.

In another embodiment of the present invention, illustrated in FIG. 11, the wavelength loading on the in-line amplifier in each node is alleviated. In FIG. 11, all optical network 52 for optical signal traffic includes at least first and second rings 54 and 56. Each ring 30 and 32 has at least one transmitter and one receiver and its own distinct ring band of the optical signal traffic. All of the optical signal traffic is transmittable throughout the entire all optical network 52. Each receiver is configured to receive only wavelengths in a ring band designated for its associated ring 54 and 56. A central hub couples first and second rings 54 and 56, and separates the optical signal traffic into the ring bands.

In FIG. 11, some of the wavelengths can be sent to a second ring without going back to the originating ring. Thus the wavelength loading on each optical amplifier can be alleviated.

By way of illustration, in FIG. 11 all the optical signal traffic is separated into two ring bands 53 and 55. Band 53 is for intra-ring traffic and band 55 is for hub or intra-ring traffic. Ring bands 53 and 55 can contain more than 200 wavelengths. Additionally, more than 200 wavelengths inside rings 54 and 56 can support both the wavelength-consuming broadcast-and-select architecture and long-term traffic growth. In FIG. 11, band 55 travels inside one ring, while band 53 goes to the second ring. Each ring 54 and 56 includes at least one 1×1 or 1×2 hub switch 58 and 60, respectively. Switches 58 and 60 are controlled by a reserved out-of-band optical supervision channel (OSC). In one embodiment, the OSC is a 1510 nm channel. The OSC channel travels along the entire ring 54 and 56 hop-by-hop, a illustrated in FIG. 12.

Figure 12:
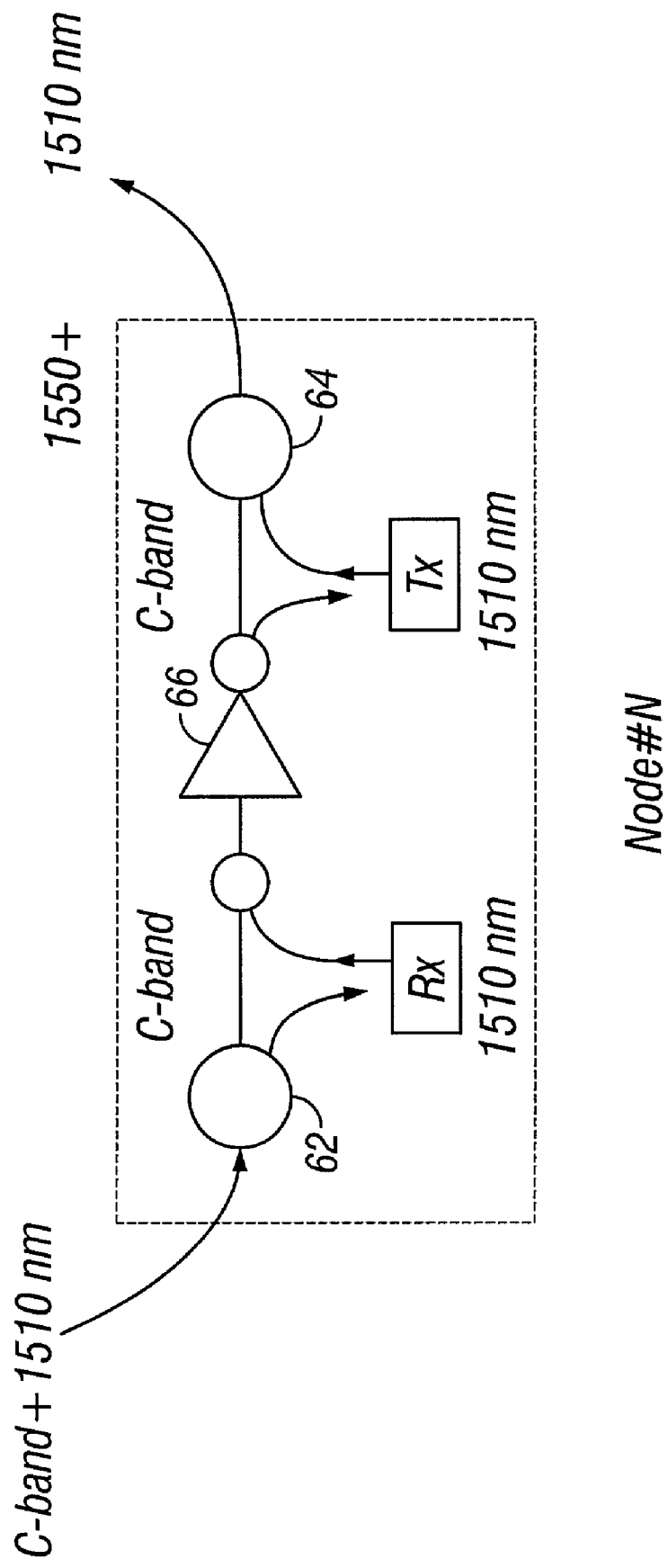
FIG. 12 illustrates an out-of-band optical supervision/communication channel at 1510 nm for inter-nodal communication and protection switching.

In FIG. 12, two C-band/1150 nm couplers 62 and 64 are provided, one extracts the 1510 nm supervision signal from the ring and the other couples the 1510 nm supervision signal back to the ring. Consequently, 1510 nm supervision signals, which contain various control and management information, do not have to pass through an optical amplifier 66. Because the out-of-band OSC channel monitors the operation status of both equipment and fiber in each ring node hop-by-hop, any fiber and/or amplifier break of network 52 can be immediately reported to a network manager based on the status of the OSC channel.

All or some of the ring bands can have the same or different numbers of optical signals. Preferably, none of the ring bands share common wavelengths and every wavelength in the optical signal traffic is in a ring band. First and second rings 54 and 56 can be geographically dispersed or hierarchical rings.

Rings 54 and 56 can be the same as ring 12 and include first and a second protection fibers 14 and 16, switch 22 and central hub 24, with the optical signal traffic traveling in clockwise direction 18 in first fiber 14 and in counter-clockwise direction 20 in second fiber 16. Again, in this embodiment, switch 22 is maintained in an open position when there is no break point in an associated ring, and is then closed when there is a break point in a ring.

Figure 13:
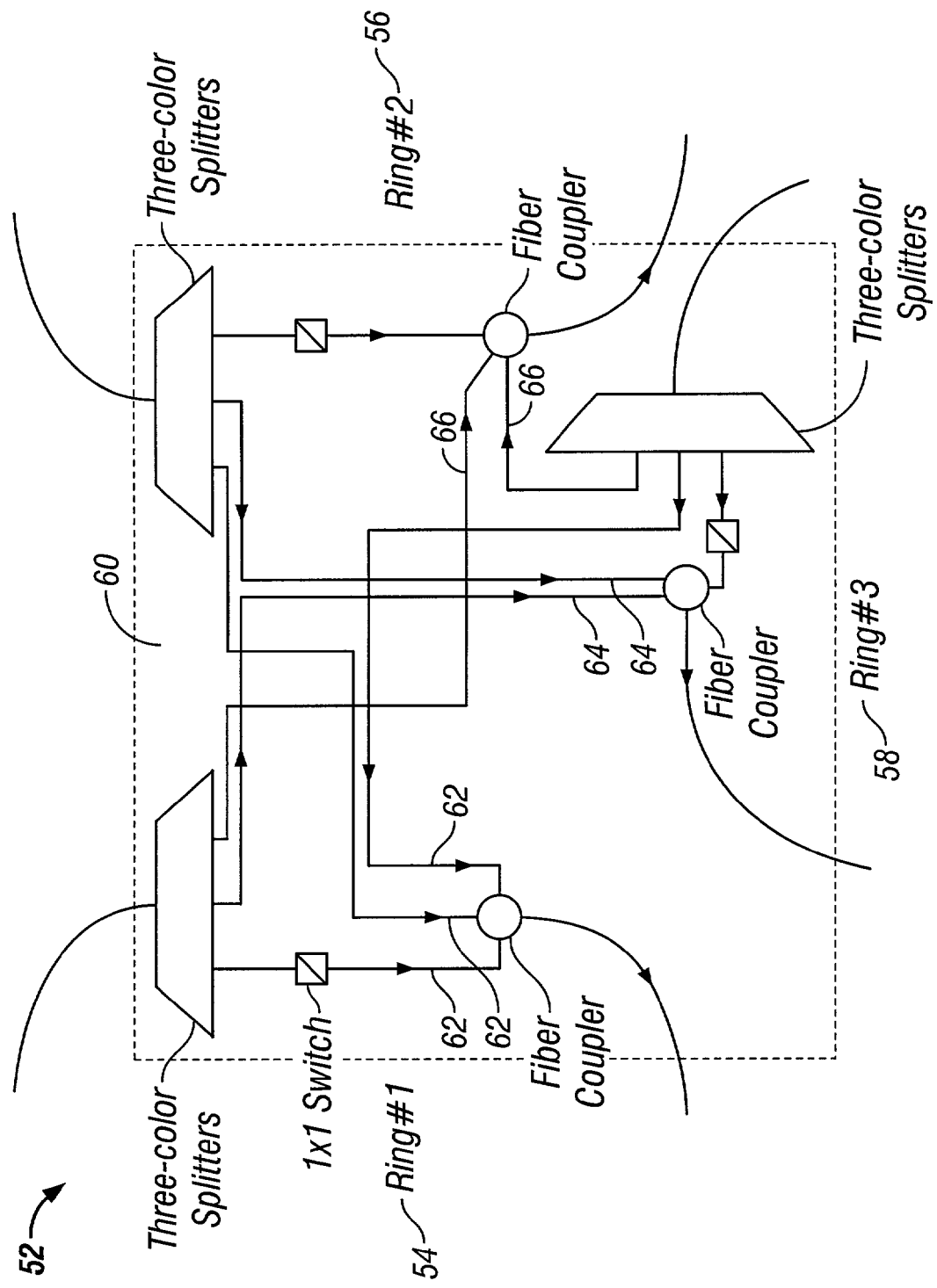
FIG. 13 illustrates a central hub construction without O-E-O conversions for interconnecting three ring networks.
Figure 14:
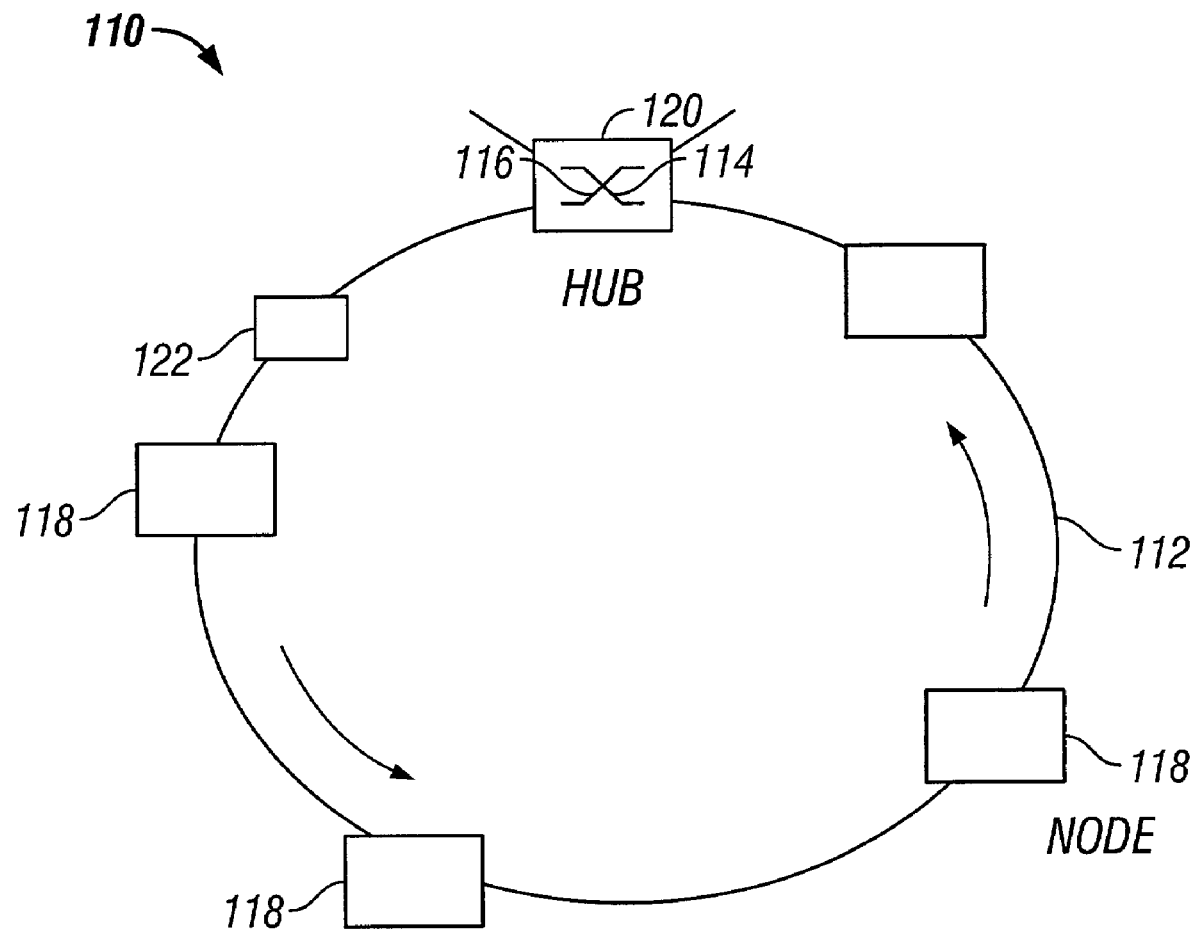
FIG. 14 illustrates one embodiment of a broadcast and select all optical network of the present invention.

In FIG. 13, network 52 has a third ring 58 and a central hub 60 does not have O-E-O conversions. In this embodiment, optical signal traffic is separated into bands 62, 64 and 66 that are separately assigned to each ring 54, 56 and 58. Central hub 60 includes a band-splitter that separates the wavelengths of the optical signal traffic originated within network 52. In central hub 60, the optical signal traffic heading for first ring 54 combines with the optical signal traffic originating from second and third rings 56 and 58 and merge back into first ring 54. A similar structure is used for a second fiber. As illustrated, 1×3 couplers are used in each ring 54, 56 and 58 to combine the same band of signals from the three different rings.

It will be appreciated that the FIG. 13 embodiment can be extended to more than three rings. When the number of rings becomes large, multi-color band splitters, all-optical switches, and multi-color combiners are utilized as shown in FIG. 11. If each band contains P wavelengths, then the use of multi-band splitters and combiners can significantly reduce the size of the N×N switch or crossconnect (the conventional approach) by $p^2$ times. An M×M switch is used because its loss can significantly lower than that of 1×M couplers.

In another embodiment of the present invention, a sufficiently large enough number of wavelengths are shared in at least two rings of large metro ring networks to eliminate O-E-O conversions between the rings. In various embodiments, the number of wavelengths is greater than 300 wavelengths/fiber, greater than 250 wavelengths/fiber and greater than 200 wavelengths/fiber. It will be appreciated that this embodiment can be achieved with a different large number of wavelengths. These embodiments can be implemented, by way of illustration but without limitation, in the large metro ring networks illustrated in FIGS. 3(a) and 3(b).

Figure 3A:
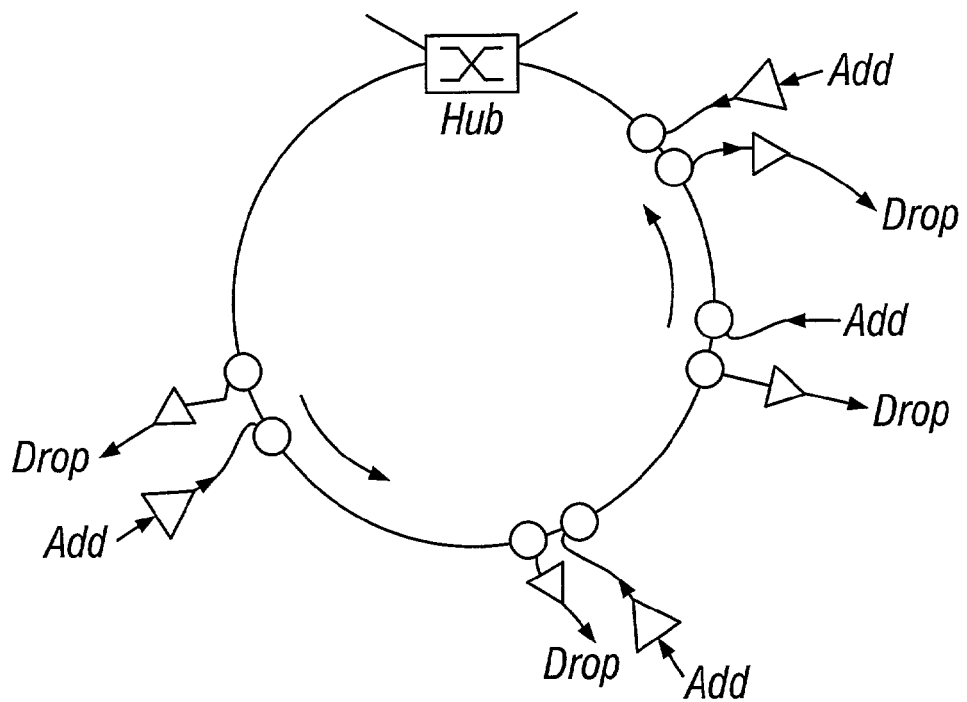
FIG. 3(a) is a schematic diagram of a broadcast-and-select or "one hop" optical ring network using only optical couplers at each node.

In the FIG. 3(a) embodiment, booster and pre-amplifiers may not be needed. In FIG. 3(a), the main path of the optical ring consists of only passive components. The FIG. 3(a) architecture is suitable for a small ring circumference. The FIG. 3(b) architecture is suitable for a ring network with a large circumference.

In these embodiments using a very large number of wavelengths, optical couplers are positioned along the main path of the ring network and all wavelength-dependent-OADMs are eliminated. This ring network is a broadcast-and-select optical network which is also referred to as a one-hop network. When optical amplifiers are not used, the number of available wavelengths can be extremely large, especially when the wavelength channel spacing is much smaller than the conventional ITU gird. In this case, however, the network size may be relatively small, because each coupler introduces additional loss.

Figure 2:
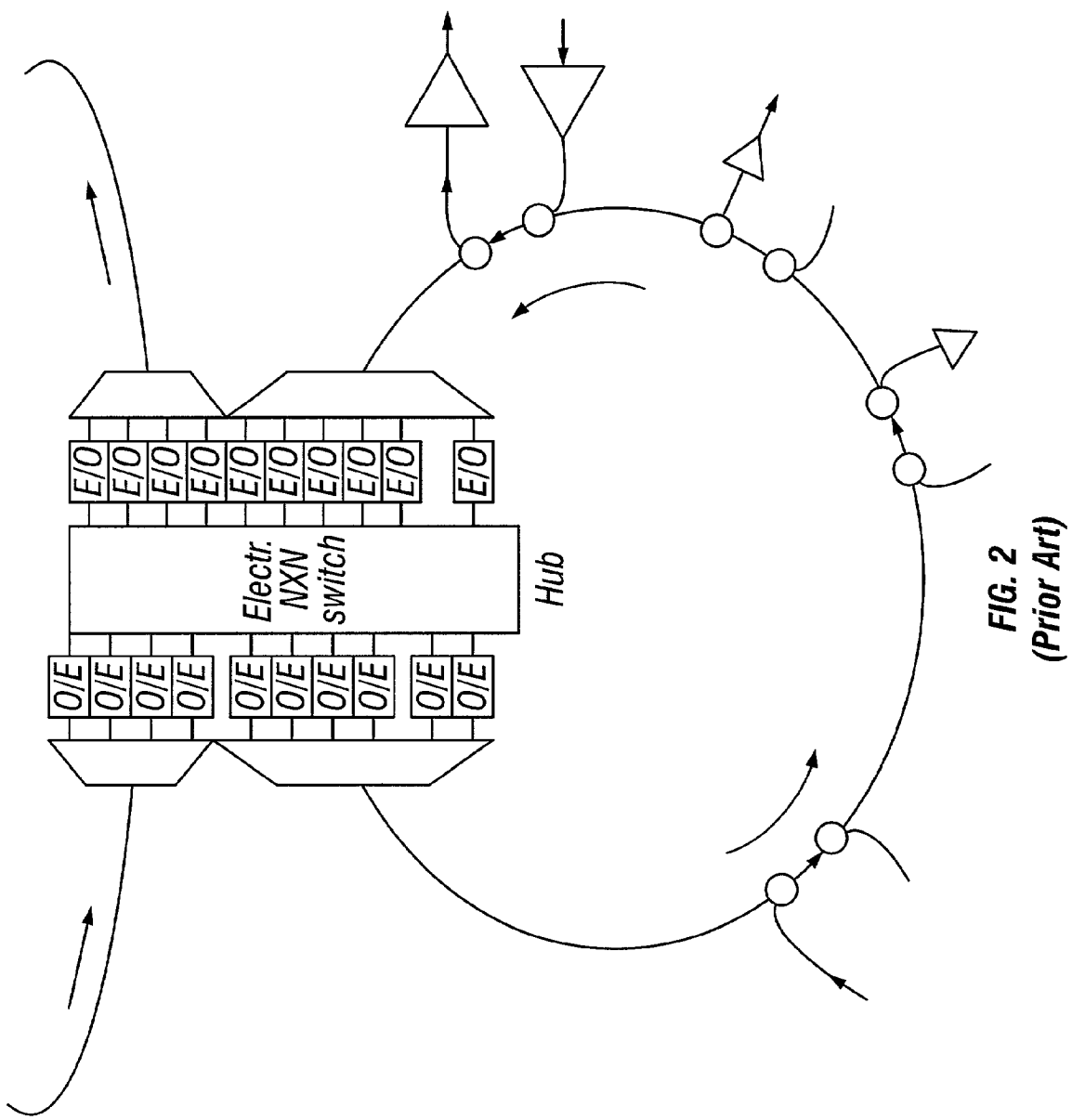
FIG. 2 illustrates a conventional central hub consisting of DWDM mux/demux and electronic N×N switches.

If optical amplifiers are used, the number of available wavelengths is dependent on the usable bandwidth of the amplifiers. The wider the amplifier gain bandwidth, the more wavelengths are available and no wavelength reuse is necessary. When broadband optical amplifiers are used in combination with ultra-dense WDM technology, as disclosed in U.S. patent application Ser. No. 09/575,811, dated May 22, 2000, incorporated herein by reference, the number of wavelengths that can be used is very large. It can be desirable to minimize or eliminate the use of active components such as optical amplifiers in order to enable the usage of a large number of wavelengths in a relatively short ring network as disclosed in U.S. application Ser. No. 60/309,220 filed Jul. 31, 2001 which is incorporated herein by reference. In one method of the present invention, the FIG. 2(a) ring network acts as a metropolitan passive optical network.

In one embodiment of the present invention, the available number of wavelengths is large enough and are transmitted over a long distance, including but not limited to over 1500 km of conventional single-mode fibers, and can cover multiple interconnected optical networks. In this embodiment, all of the wavelength converters and regenerators between optical networks are eliminated. Additionally, all of the wavelength-dependent OADMs within an optical ring network are also eliminated.

Figure 3B:
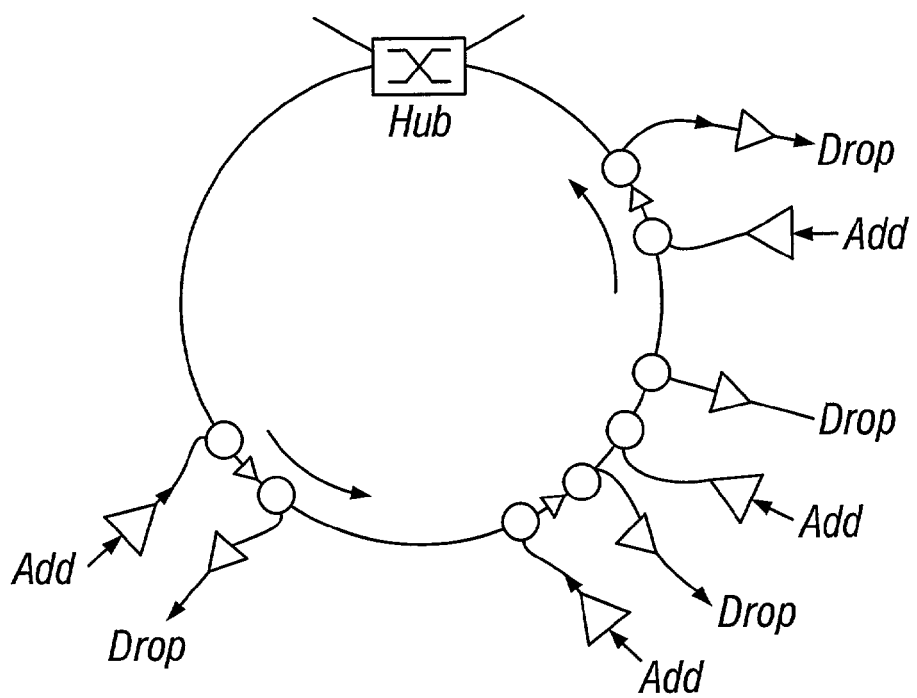
FIG. 3(b) is similar to FIG. 3(a), except that there are in-line amplifiers inserted between add and drop ports.

In FIG. 3(b), the all optical network has a large circumference, for example greater than 1500 km, and in-line optical amplifiers are added between the add and drop broadband couplers. The in-line optical amplifiers are gain-flattened and gain-equalized. Gain flattened for all wavelengths is used in order to achieve equal gain. Gain flattening is required in order to ensure that when the number of wavelengths on a ring changes, the available amplifier gain for each wavelength remains constant. It is not necessary to place the in-line optical amplifiers at every node in a ring. With this embodiment, the all optical network can be upgraded in capacity and the dynamic wavelength add-drop functionality is made easier because both of these functions can be carried out "off-line" without affecting the main path of the ring. The only limitation is that, due to the limited saturation power of an in-line amplifier, the total number of wavelengths traveling along the ring cannot be more than what an in-line amplifier can handle.

Referring now to FIGS. 14 and 15(a) through 15(f), the present invention is also an all optical network, generally denoted as 110, for optical signal traffic. A first ring 112, with least one transmitter 114 and receiver 116, has the first ring including a number of network nodes 118. Ring 112 includes one or more add/drop broadband couplers 120. Broadband coupler 120 has an add port and a drop port to add and drop wavelengths to and or from the first ring. Broadband coupler 120 also has a pass-through direction and an add/drop direction, and is configured to minimize a pass-through loss in first ring 112. Preferably, broadband coupler 120 is positioned on the first ring. Network 110 can be a passive optical network, without in-line optical amplifiers, or a non-passive optical network, with in-line optical amplifiers.

Ring 112, as well as other rings associated with network 110, can have any number of nodes and in one specific embodiment, there are 3 to 20 nodes. By way of illustration, and without limitation, the circumference of ring 112 can be 5 to 1000 km. A loss pad 122 can be included with network 110. In one embodiment, loss pad 122 maintains at least 25 dB round-trip traveling loss around the ring 112. Loss pad 122 minimizes coherent crosstalk from re-circulated signals.

As illustrated in FIGS. 15(a) through 15(f), broadband coupler 120 can includes at least a 1×2 coupler 124, to add traffic, a 1×2 coupler 126, to drop traffic, a booster 128 that compensates for add/drop loss on ring 112, a pre-amplifier 130 to compensates for add/drop loss on ring 112 and an in-amplifier 132 to compensate for add/drop loss on the first ring.

Figure 16:
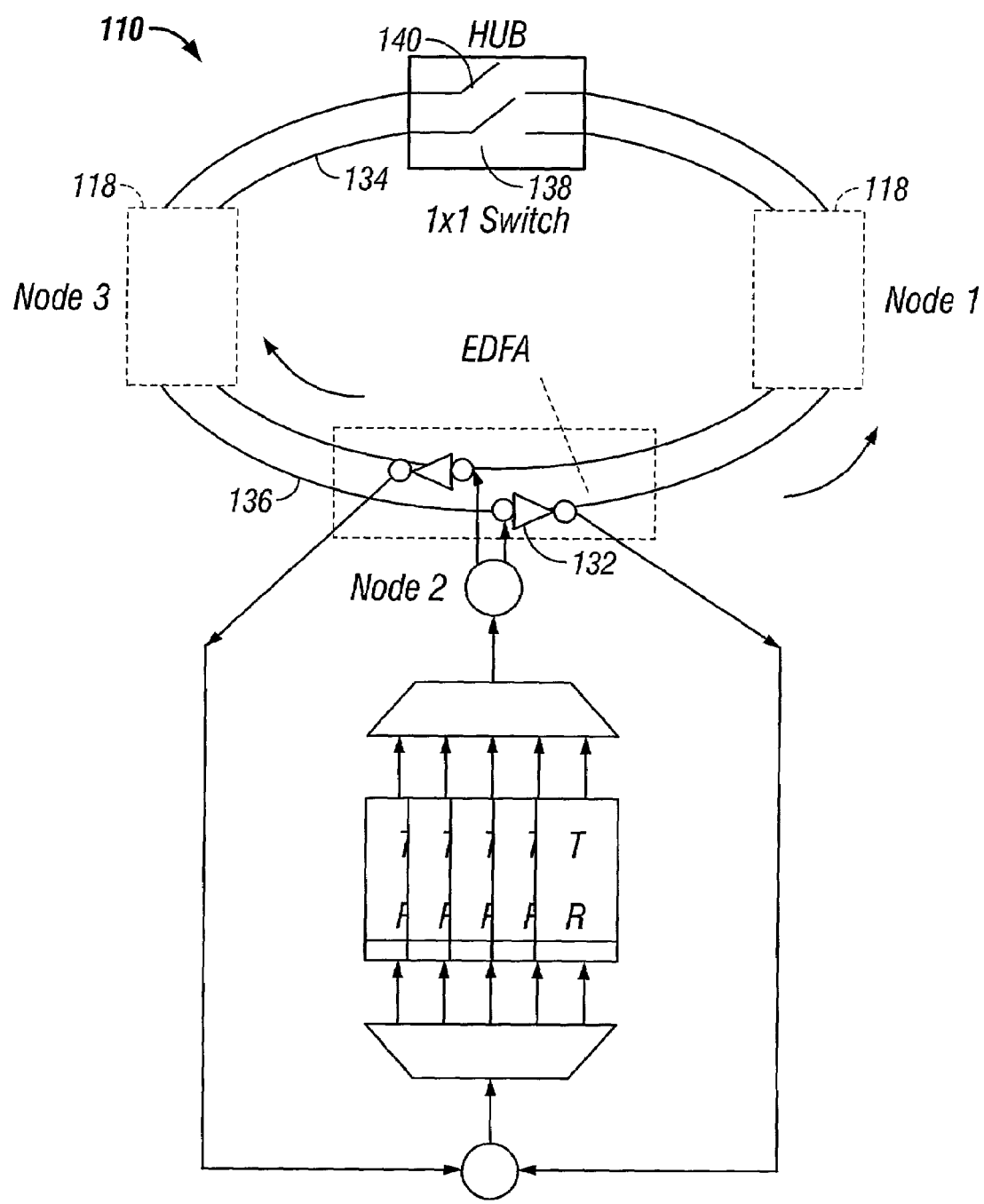
FIG. 16 illustrates operation of protection switches in the central hub and nodes of the FIG. 14 embodiment when there is a break in a fiber.

Referring now to FIG. 16, the rings of network 110 can have one or more working fibers 134 and protection fibers 136 that carry all of the optical signal traffic. Optical signal traffic travels in a clockwise direction in working fiber 134 and in a counter-clockwise direction in protection fiber 136. At least one 1×1 or 1×2 switch 138 is coupled to working fiber 134, and at least one 1×1 or 1×2 switch 140 is coupled to protection fiber 136. Preferably, an open 1×1 switch is maintained on the rings of network 110 in order to eliminate a fiber ring lasing phenomenon that can arise in response to gain provided by an in-line amplifier 132 that is coupled to the ring.

Figure 17:
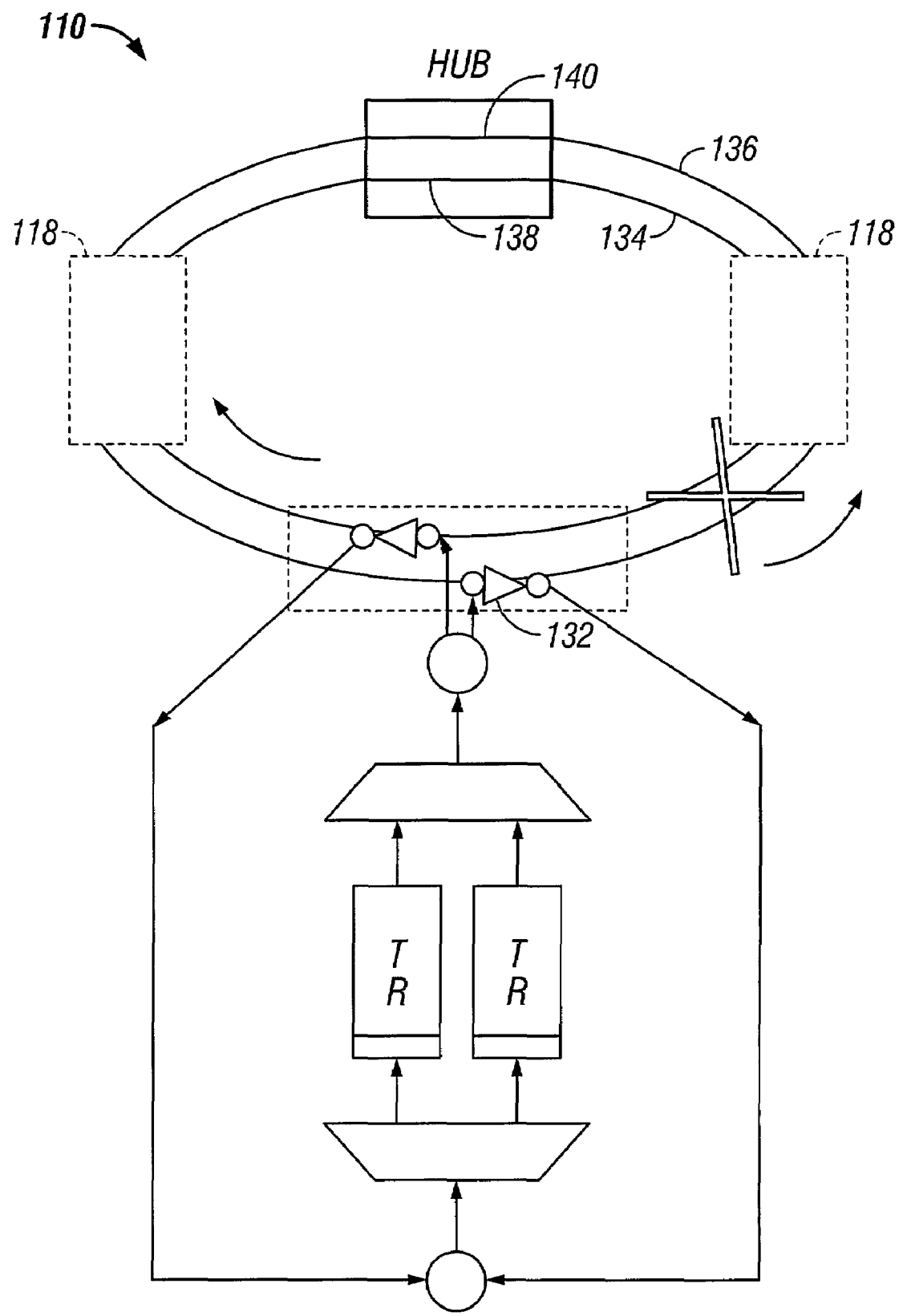
FIG. 17 illustrates an embodiment of the FIG. 16 protection switches when there is no break in a fiber.

Each 1×1 or 1×2 switch 138 and 140, as shown in FIG. 16 and 17, is maintained in an open position if there isn't a break point in the ring of network 110. Each 1×1 or 1×2 switch 138 and 140 is closed when there is a break point in the ring.

Figure 18:
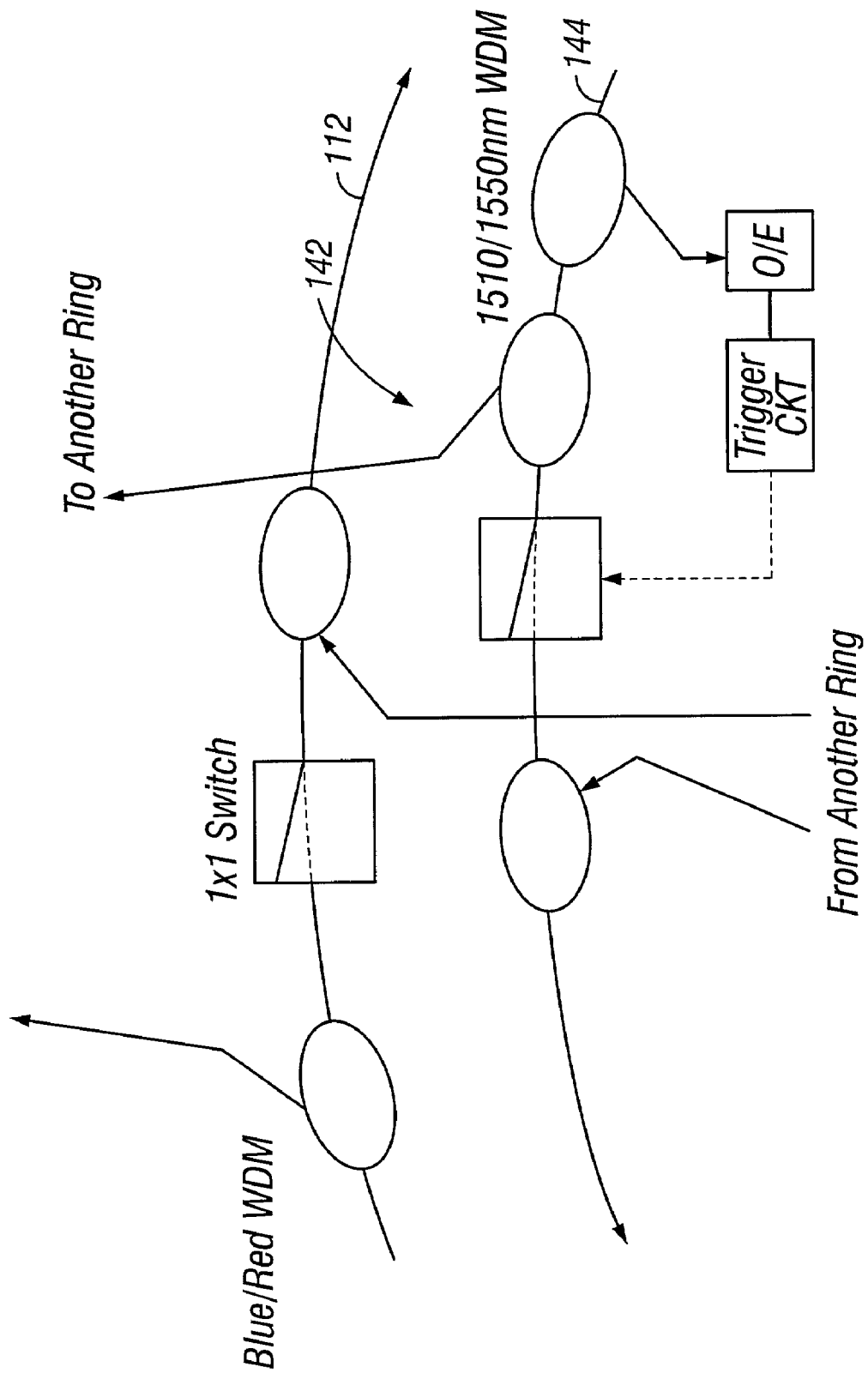
FIG. 18 illustrates a hub structure that can be utilized with the FIG. 14 embodiment.
Figure 19:
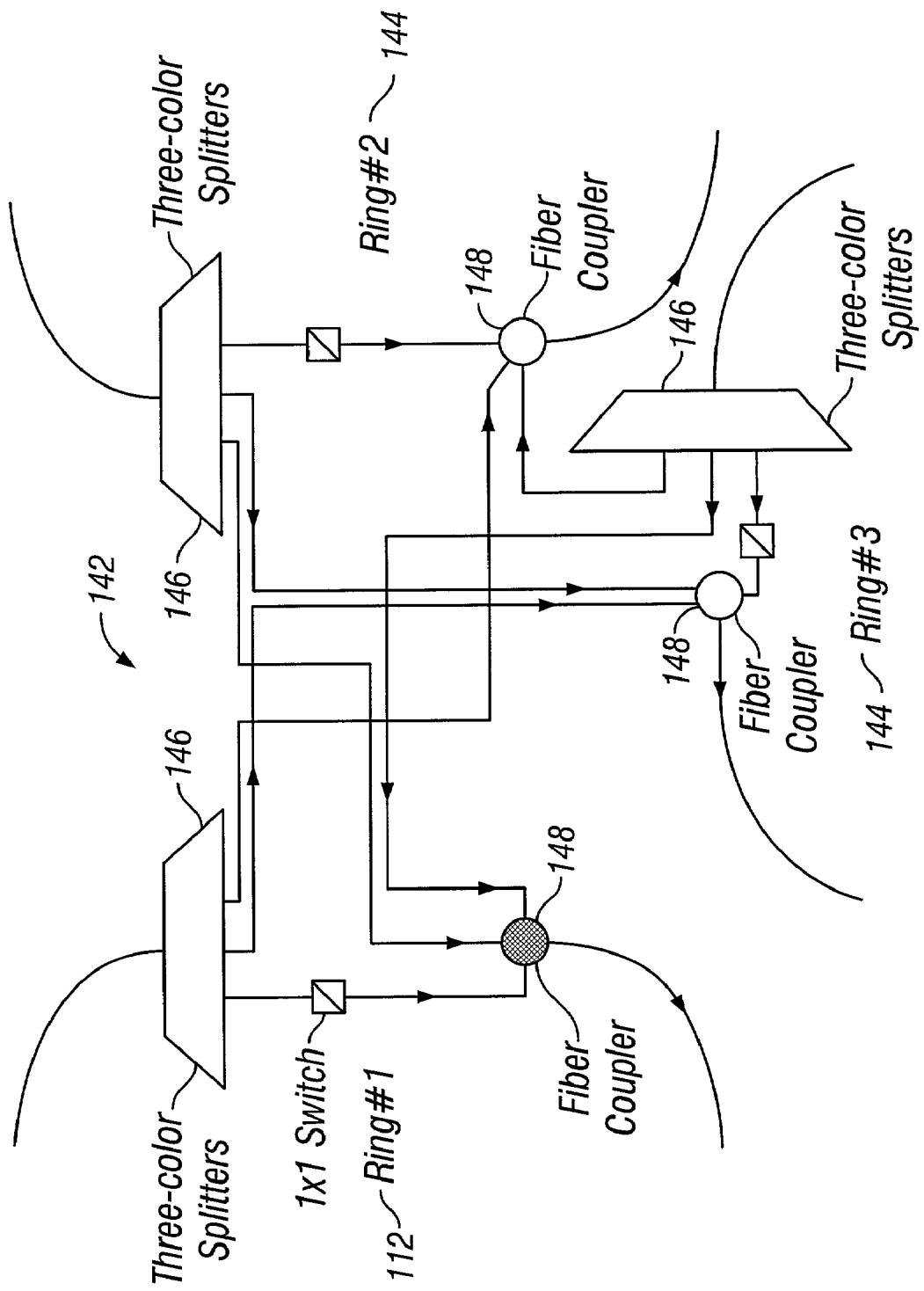
FIG. 19 illustrates the FIG. 14 embodiment with three coupled rings.

Referring to FIGS. 18 and 19, an all-optical hub 142 couples first ring 112 to one or more second ring 144. All-optical hub 142 separates optical signals in each ring 112 and 144 into wavelength bands. The number of wavelength bands is equal to the number of rings 112 and 144 in network 110. All-optical hub 142 can include at least one 1×N band-splitter 146 and an N×1 coupler 148 that couples optical signal traffic among rings 112 and 144. N is the number of rings 112 and 144 that are coupled which in the FIG. 19 embodiment is three. Each 1×N band splitter 146 launches optical traffic that originates from one ring 112 and 144 to one or more different rings 144 or 112 in response to its associated wavelength band. Each N×1 148 coupler launches to any selected ring 112 or 144 in network 110 the wavelength bands from the other rings 144 or 112.

Figure 20A:
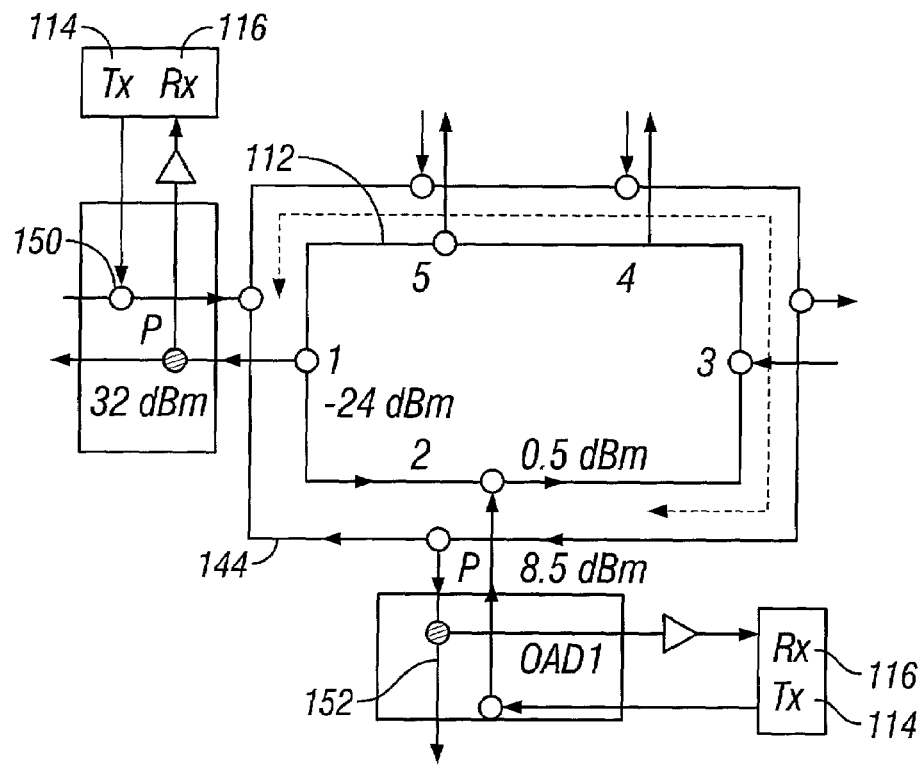
FIG. 20(a) illustrates the FIG. 14 embodiment as an all passive optical ring.
Figure 20B:
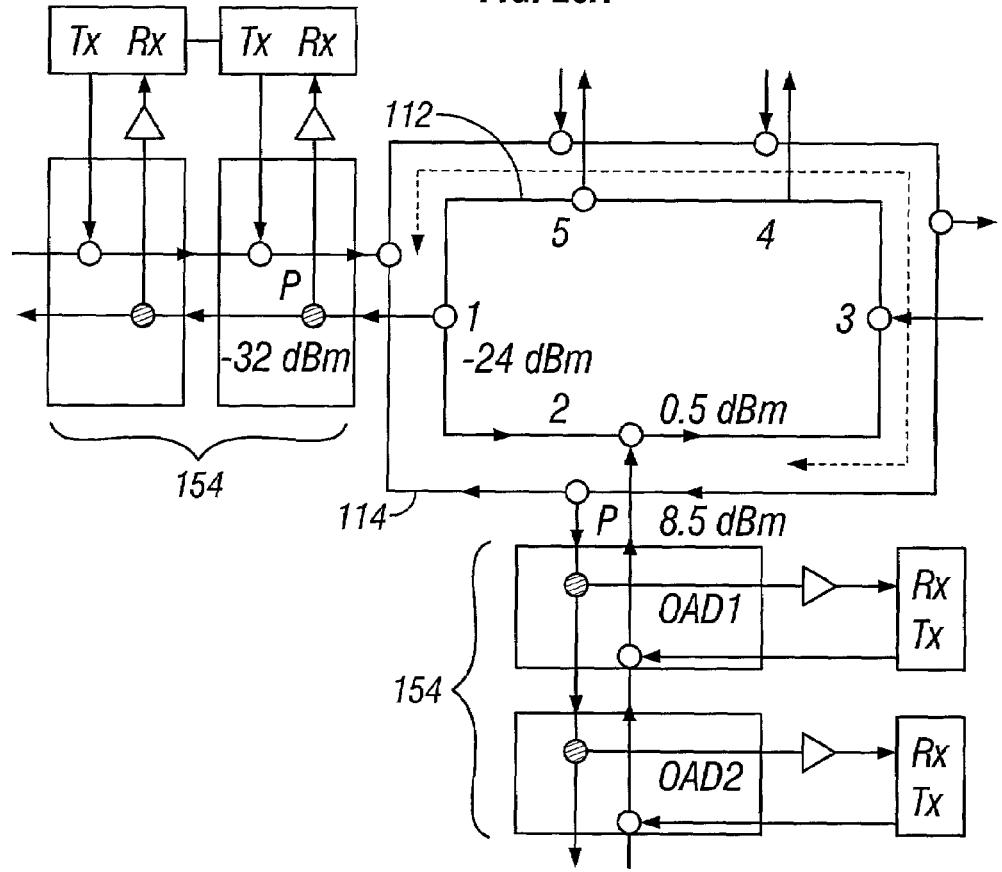
FIG. 20(b) illustrates another embodiment of the FIG. 20(a) all passive optical ring network.
Figure 20C:
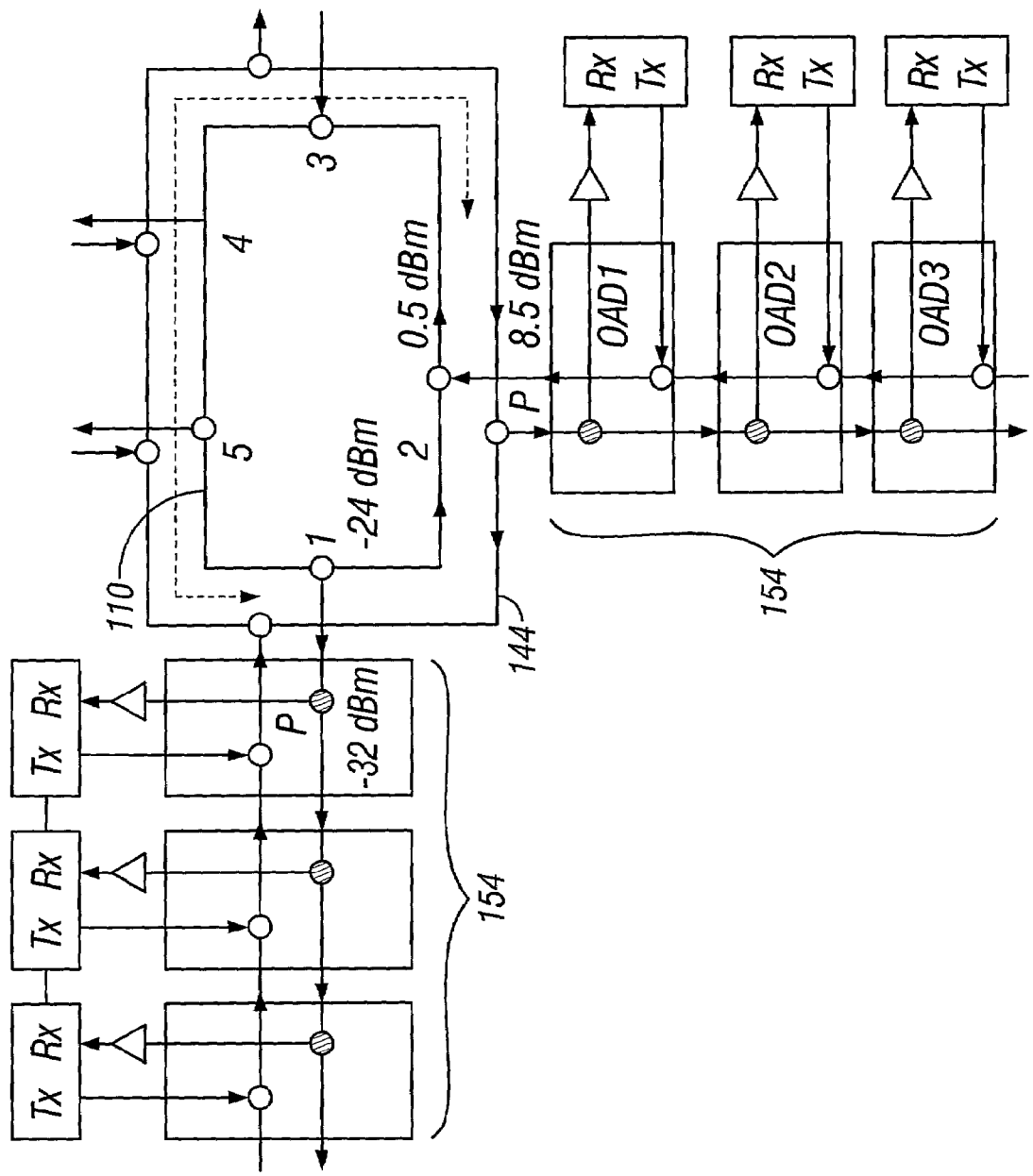
FIG. 20(c) illustrates another embodiment of the FIG. 20(a) all passive optical ring network.
Figure 20D:
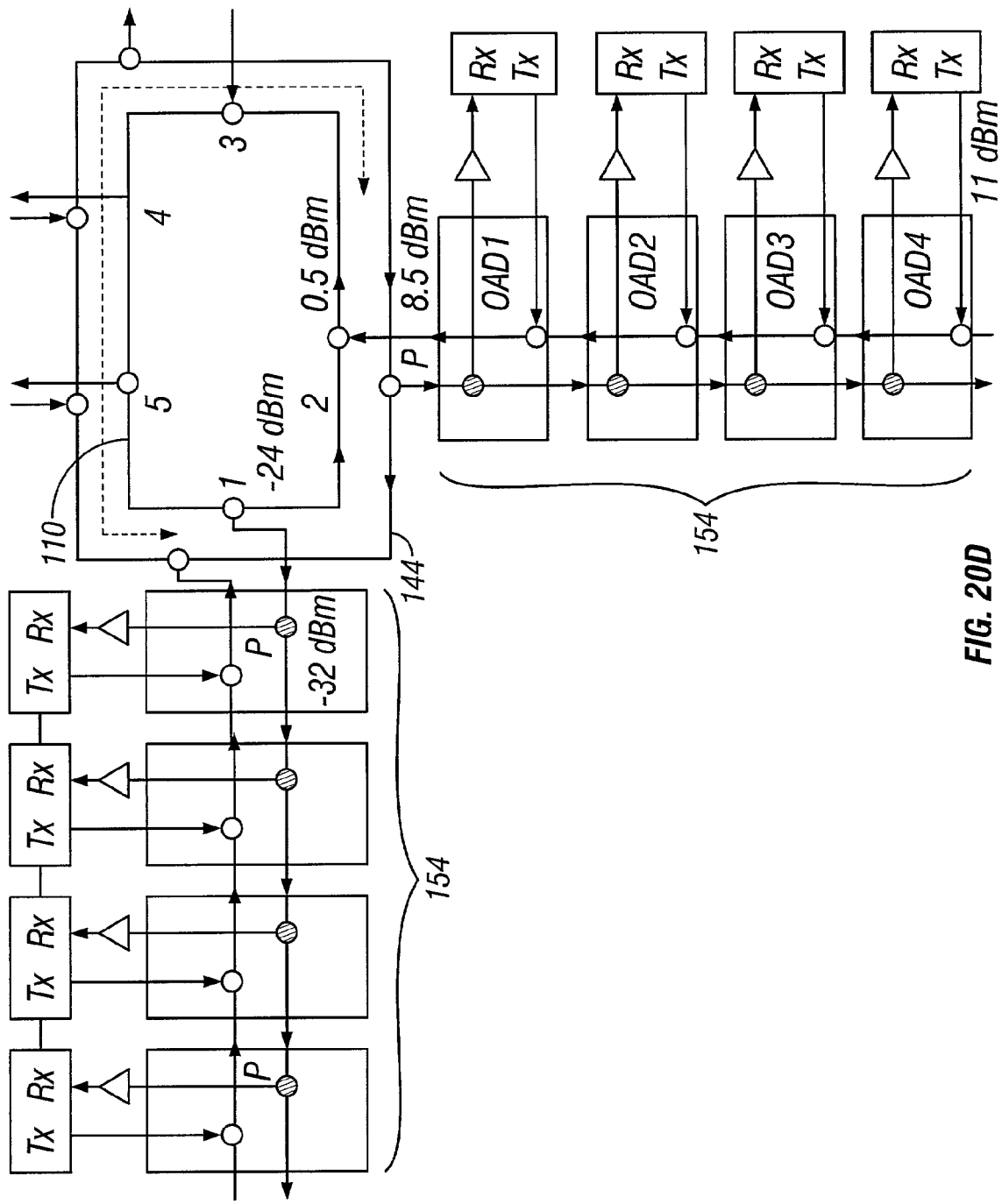
FIG. 20(d) illustrates another embodiment of the FIG. 20(a) all passive optical ring network.

As illustrated in FIG. 20(a), one or more first and a second wavelength-dependent three-port add-drop filters 150 and 152 are coupled to each network node 118. First wavelength-dependent three-port add-drop filter 150 adds signal traffic in an add direction; and second wavelength-dependent three-port add-drop filter 152 drops traffic in a drop direction. Each first and second wavelength-dependent three-port add-drop filter 150 and 152 is positioned off ring 112 and 144. In one embodiment, first wavelength dependent three-port add-drop filter 150 is coupled to first ring 112 in the add/drop direction and includes input and drop ports. A plurality of wavelength-dependent three-port add-drop filters, generally denoted as 154, can be provided and are cascaded at each node 118 for the drop direction in order to drop multiple wavelengths, and also cascaded for the add direction to add multiple wavelengths, see FIG. 20(b)–20(d).

Figure 21:
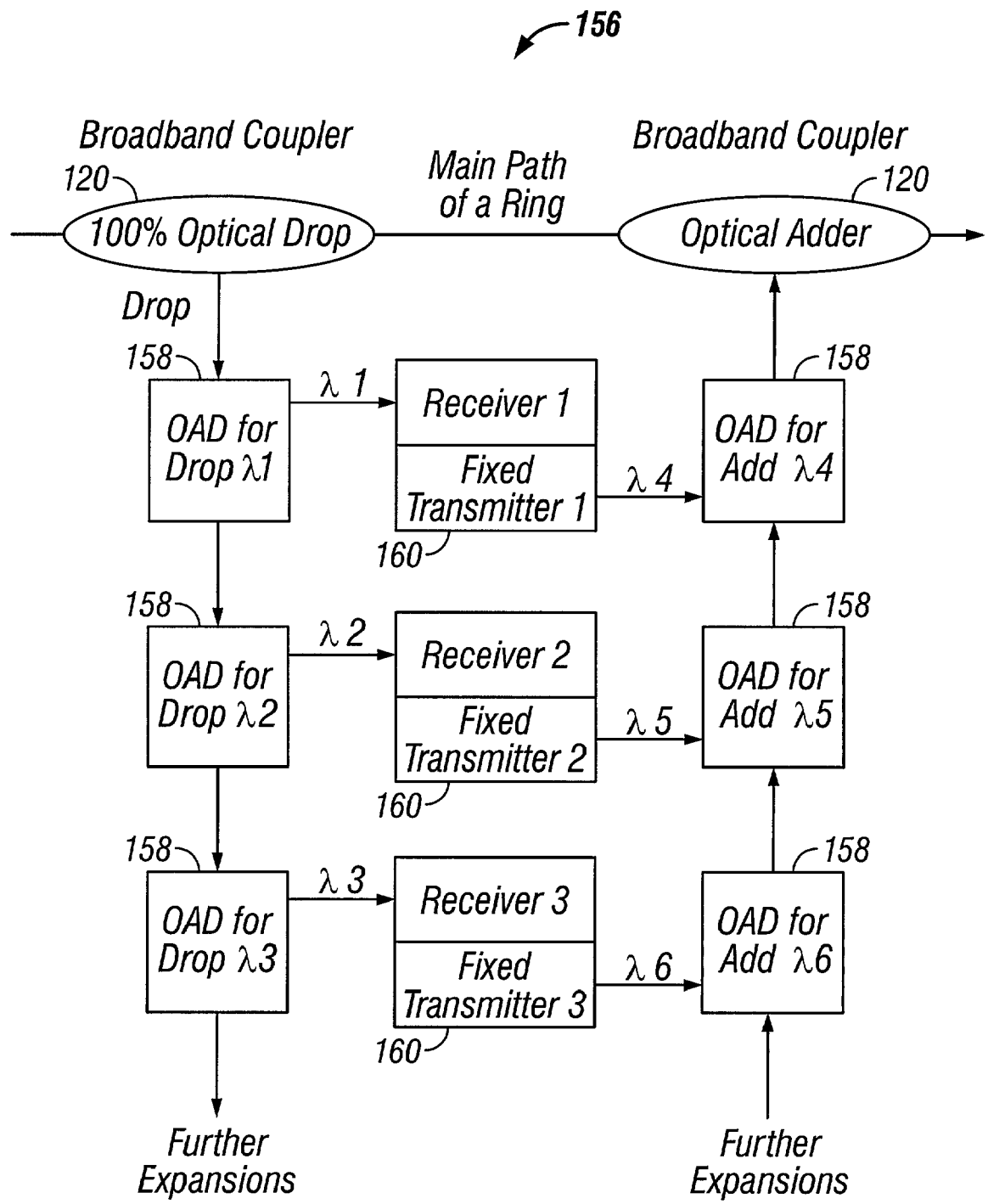
FIG. 21 illustrates the FIG. 14 embodiment with series add/drop off-line.
Figure 22:
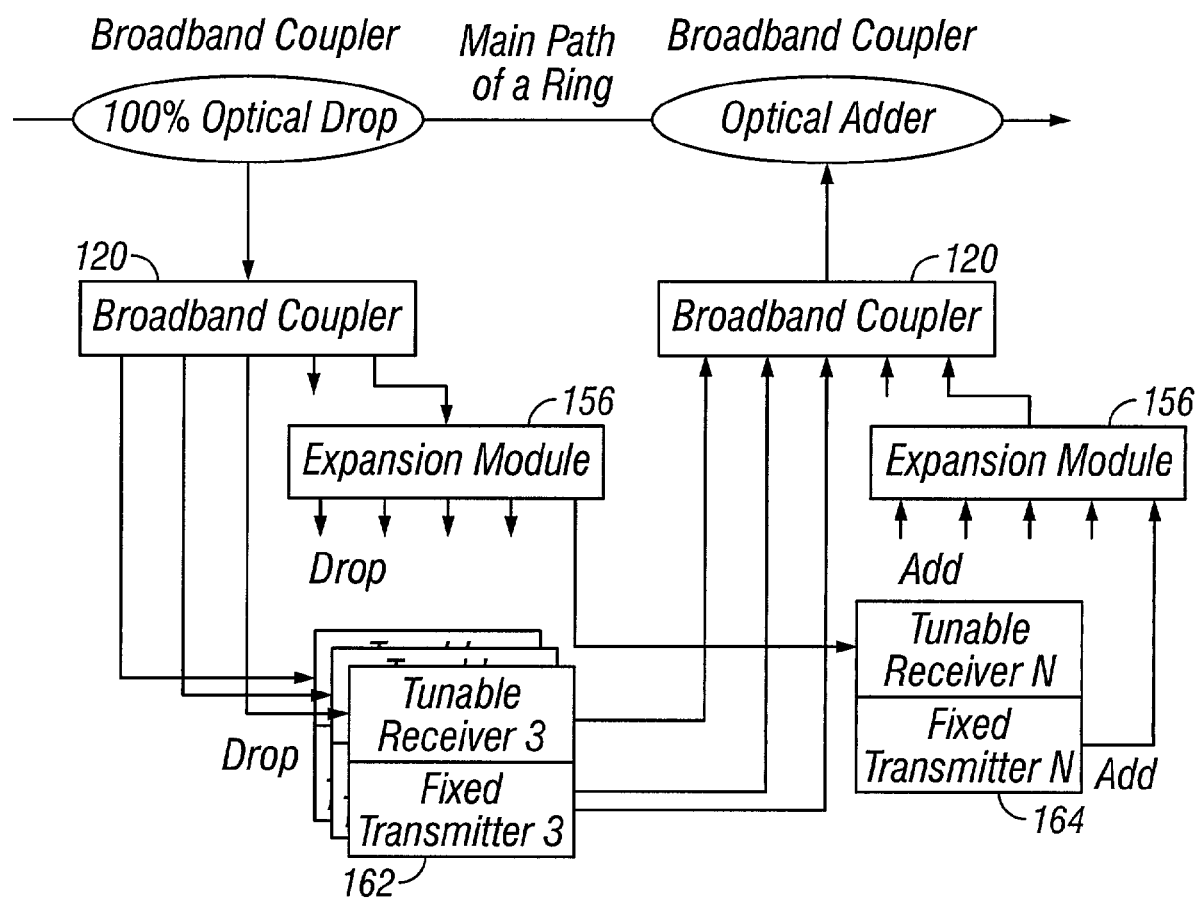
FIG. 22 illustrates the FIG. 14 embodiment with parallel add/drop off-line.

In another embodiment, illustrated in FIGS. 21 and 22, one or more expansion modules 156 can be coupled to each ring 112 and 144 in order to add and drop more than one wavelength. Each expansion module 156 can include one or more cascaded three-port optical add/drop filters 158 and a plurality of multiplexed transmitters 160 for adding wavelengths. The wavelengths that are added are different from the wavelengths that are dropped. Expansion modules 156 can each have an array of parallel filters for dropping wavelengths 162 and an array of multiplexed transmitters 164 for adding wavelengths. Again, the wavelengths added are different from wavelengths that are dropped.

Figure 23:
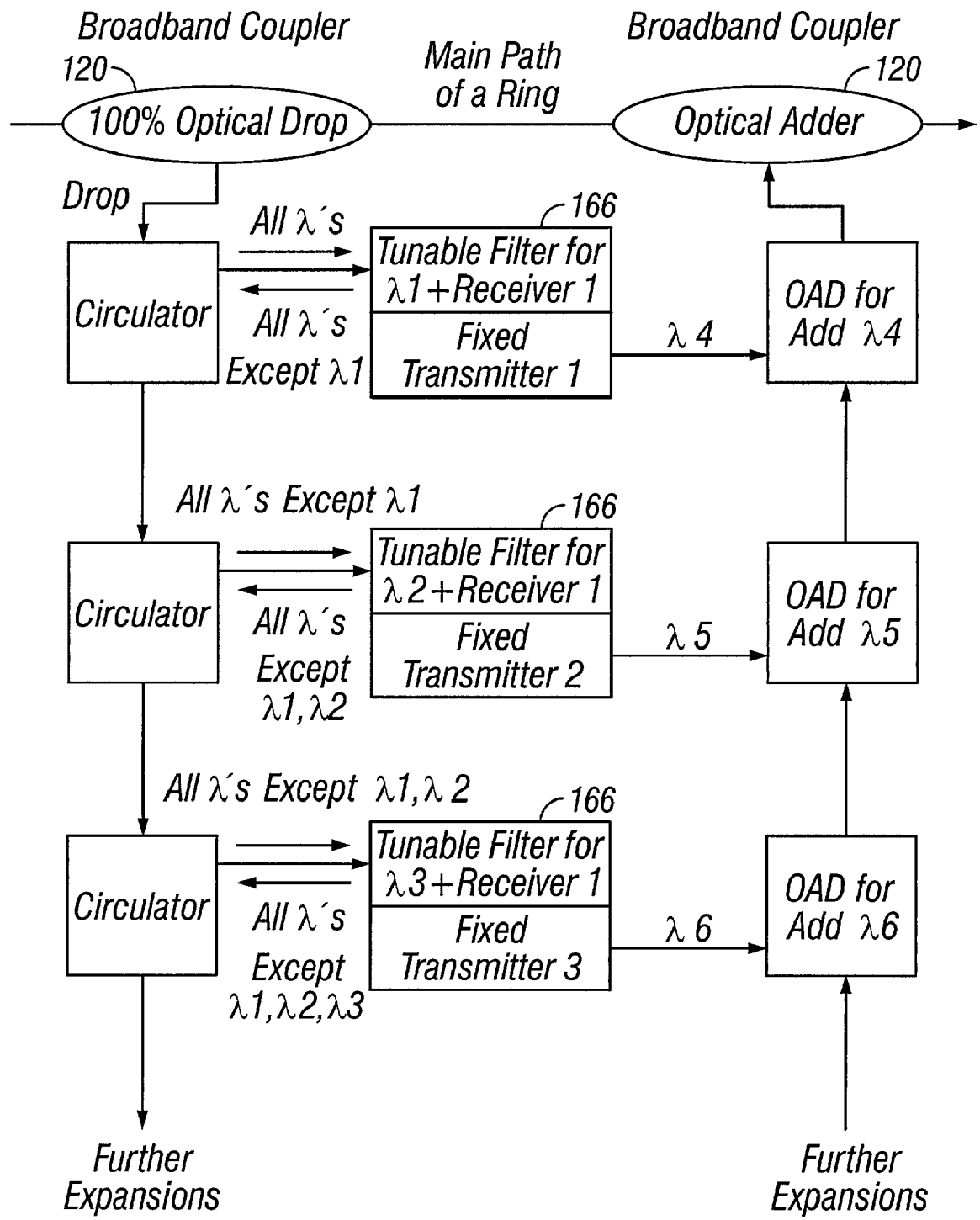
FIG. 23 illustrates another embodiment of a FIG. 14 network with series add/drop off-line.

As illustrated in FIG. 23, the drop ports of broadband couplers 120 can each include a wavelength-dependent tunable filter 120. Each tunable filter 120 reflects non-selected wavelengths to a through port for one cascaded three-port optical add/drop filter to an adjacent cascaded three-port optical add/drop filter.

While the invention has been described in connection with what is presently considered to be the most practical and preferred embodiment, it is to be understood that the invention is not limited to the disclosed embodiment, but on the contrary it is intended to cover various modifications and equivalent arrangement included within the spirit and scope of the claims which follow.

ODSB Modulation

The subject matter in the following sections relates generally to a method of transporting ultra-dense wavelength division multiplexed (U-DWDM) data in optical communication systems and more particularly, to an optical double-sideband modulation technique that presents ever higher spectral efficiency than optical single-sideband modulation technique.

General Background on ODSB Modulation

Figure 24A:
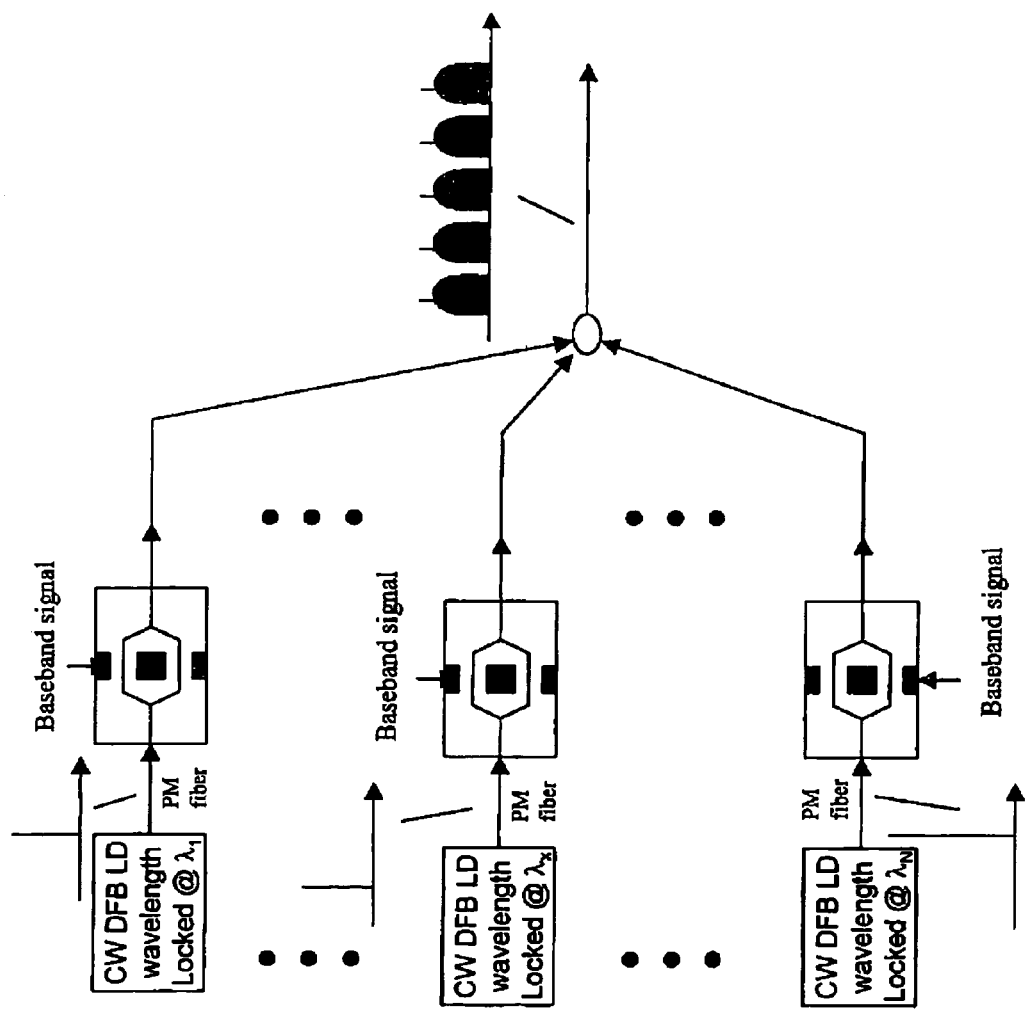
Figure 24B:
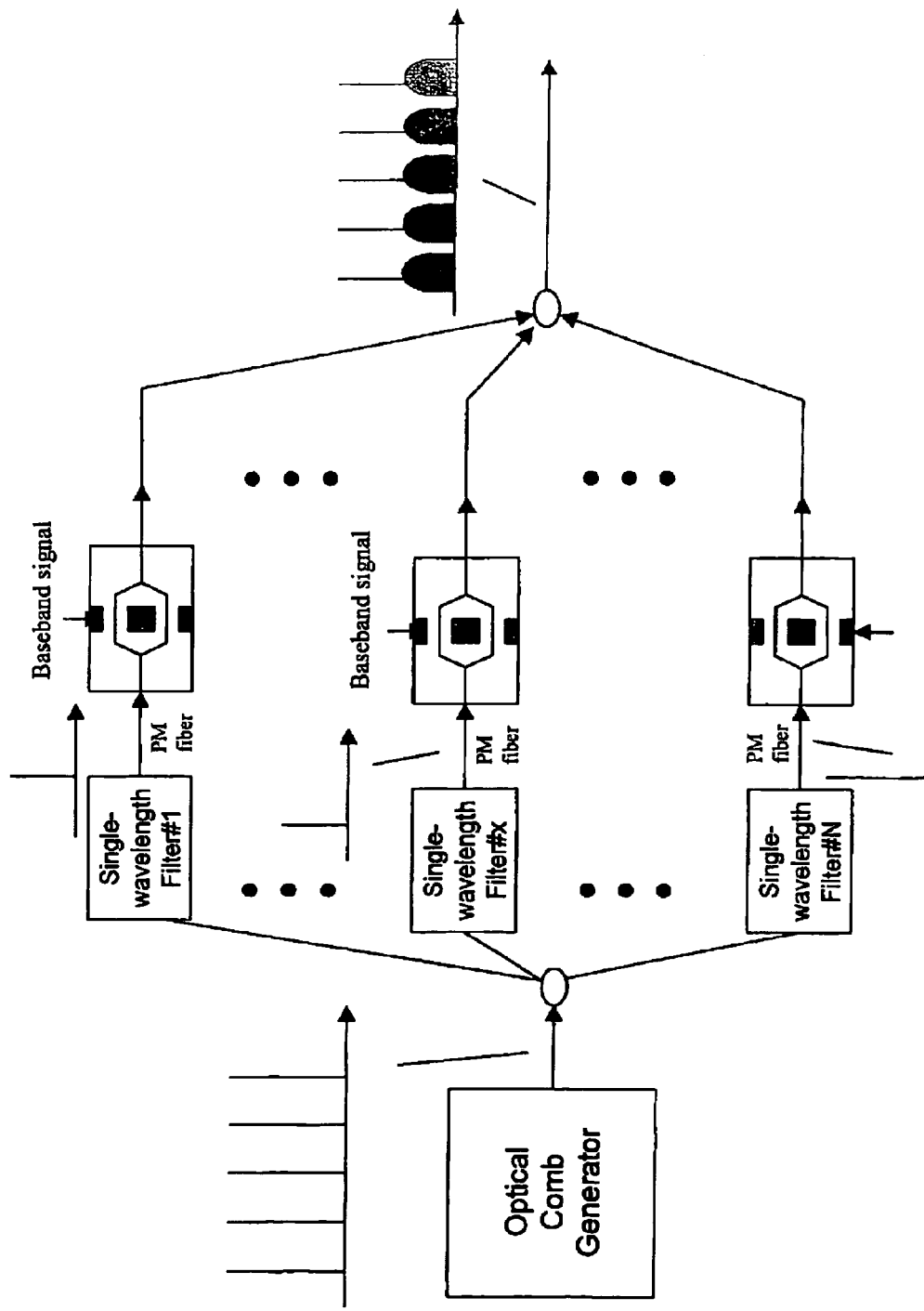

A sub-carrier multiplexed ("SCM") optical transmission system can be used to transmit both analog or digital signals (W. I. Way, Subcarrier Multiplexed Lightwave Systems for Subscriber Loop Applications, Journal of Lightwave Technology, 1988, pp. 1806–1818). Recently, there are significant interests in using SCM technology to transport multi-channel high-speed digital data on a single optical transmitter to achieve U-DWDM optical fiber systems, e.g., with U-DWDM channel spacing less than 10 GHz for 2.5 Gb/s per channel. If SCM technology were not to be used, two alternatives are shown in FIGS. 24(a) and 24(b), respectively. In FIG. 24(a), multiple CW DFB lasers (or a laser array with external modulators (or multiple externally-modulated lasers) with close channel spacing such as <10 GHz are used. The problem with this approach is that not only the center wavelength of each laser must be locked precisely, but also the physical size of the U-DWDM array may be large. In FIG. 24(b), the multiple DFB lasers on FIG. 24(a) are replaced by a optical comb generator ("Laser for generating an optical comb", U.S. Pat. No. 6,163,553, Dec. 19, 2000; "Optical frequency generator", U.S. Pat. No. 6,008,931, Dec. 28, 1999) in combination with multiple narrowband optical filters. The advantage of this approach is that the narrow channel spacing can be maintained steadily.

However, the physical size and the cost of the narrowband optical filters still present a problem.

Two main SCM techniques, which are suitable for U-DWDM application, include optical double-sideband (ODSB) and optical single-sideband (OSSB) modulation techniques. ODSB technique was proposed in U.S. Pat. NO. 5,596,436 (P. D. Sargis, et al., "Subcarrier multiplexing with dispersion reduction and direct detection", Jun. 21, 1997) and OSSB technique was proposed in many patents such as U.S. Pat. Nos. 5,101,450 (March 1992), 5,301,058 (April 1994), 5,734,493 (March 1998), and 6,116,566 (September 2000). Unlike conventional SCM systems which use broadband detection with the two information sidebands canceling each other owing to fiber chromatic dispersion-induced relative phase shift, both ODSB and OSDB techniques use a narrowband optical filter to extract only one of the information sidebands and can significantly reduce the system penalty due to fiber chromatic dispersions.

Both ODSB and OSSB can use Lithium-Niobate Mach Zehnder interferometer (MZI) modulator to carry out the modulation techniques. Their operation principles are shown in FIGS. 1A, 1B, and 1C, respectively. In ODSB technique (see U.S. Pat. NO. 5,596,436), the bias voltages on the two arms of an MZI differs by 180°, and phases of the modulating signals on the two arms also differ by 180°. From FIG. 1A, we can see that the optical carrier suppressed in ODSB. It should be noted that the elimination of optical carrier is important to avoid any optical fiber nonlinearity-induced system penalty, and to reduce adjacent channel interference from the optical carrier to the modulated signals. In FIG. 1A, however, we can see that there are two sidebands representing the same modulating signal, and consequently half of the available bandwidth is wasted.

In the first technique of OSSB (see U.S. Pat. No. 5,301,058), a complicated setup such as the one in FIG. 1B was used. The advantage of this setup however, is that the output is theoretically a pure single sideband of modulating signal. The undesired optical carrier and the second information sideband are both suppressed.

In the second technique of OSSB (see pending U.S. patent application Ser. No. 09/575,811, May 22, 2000), a simple setup using only one MZI is shown in FIG. 1C. However, the signal coming out of the MZI still contains the undesired optical carrier. Therefore, an optical notch filter was used to suppress the optical carrier.

Having reviewed the operation principles of ODSB and OSSB, we note that OSSB modulation technique is generally more complicated to implement than ODSB, but with a much better spectral efficiency. In this patent application, we propose a novel approach to use ODSB modulation technique, while still achieving a very high spectral efficiency.

SUMMARY OF THE INVENTION ON ODSB MODULATION

The present invention proposes a new U-DWDM approach by using ODSB modulation technique to achieve a high spectral efficiency. One or two wavelength-locked CW DFB lasers are used as the optical sources for one or two externally modulated LiNbO$_3$ MZIs, respectively. The center wavelength of each DFB lasers must be offset from a standard ITU wavelength. Each MZI is modulated by a few subcarrier multiplexed RE/microwave signals using ODSB modulation. If one uses only one MZI, the modulated output from MZI is passed through a narrowband optical filter. If one uses two MZIs, the two sets of ODSB modulated signals are then combined and passed through a narrowband optical filter. The modulating signal center frequencies can be adjusted, depending on (1) the bandwidth of the MZI, (2) the offset of the laser center frequency from a standard ITU grid, (3) the bandwidth of the narrowband optical filter, and (4) the minimization of system performance penalty due to four-wave mixing and other optical nonlinear effects.

DETAILED DESCRIPTION OF THE PREFERRED EMBODIMENTS ON ODSB MODULATION

Figure 24C:
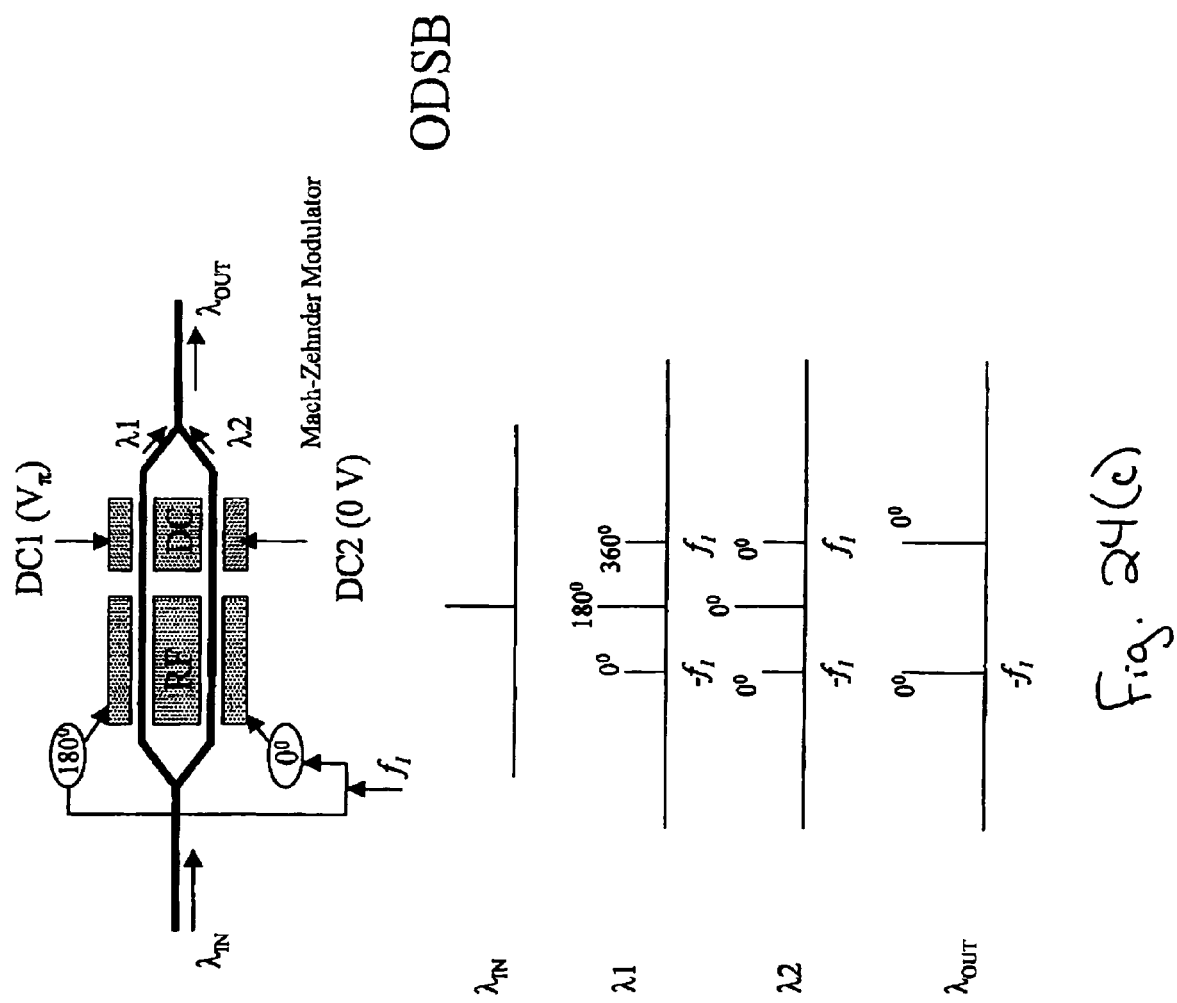
Figure 24D:
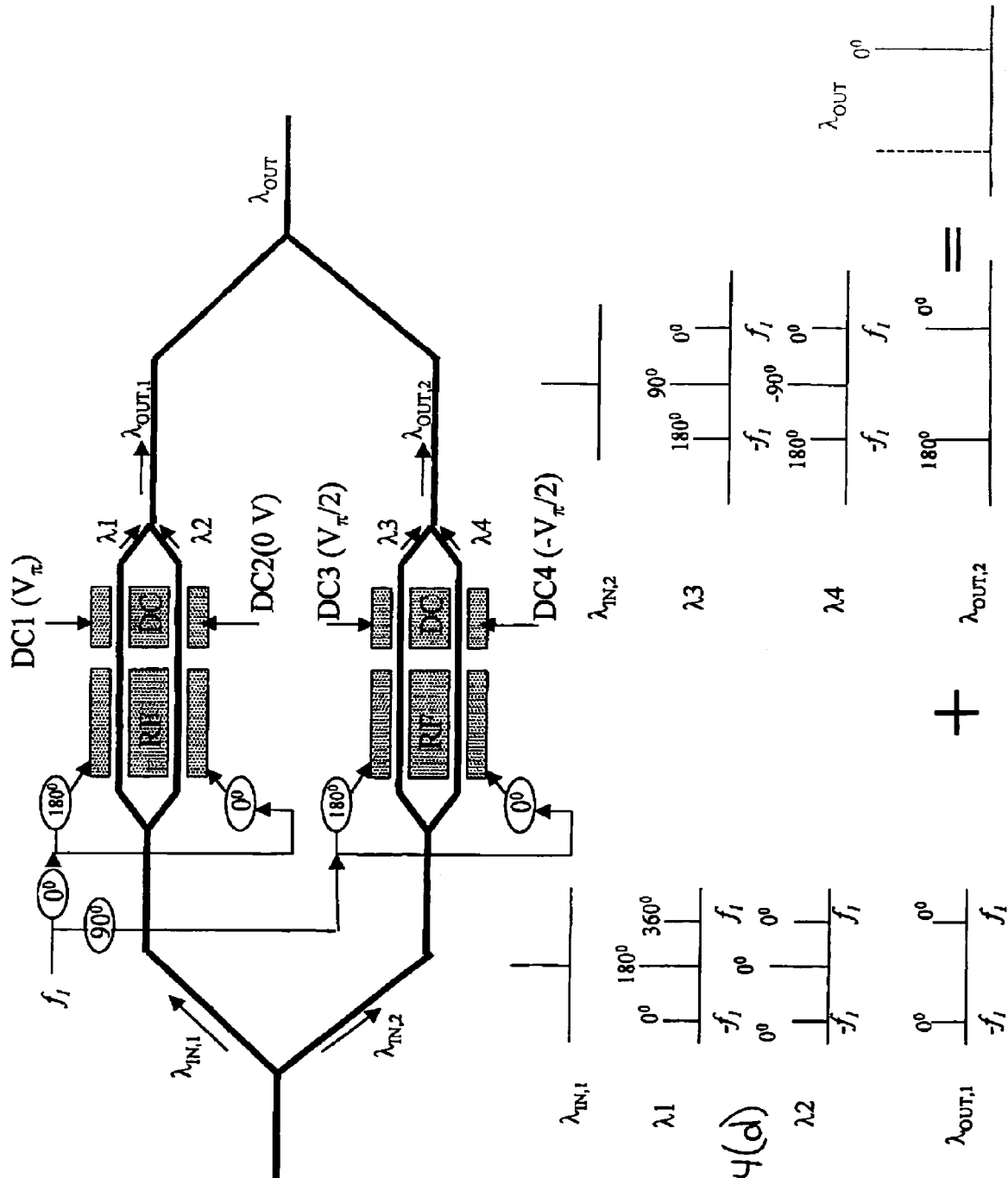
Figure 24E:
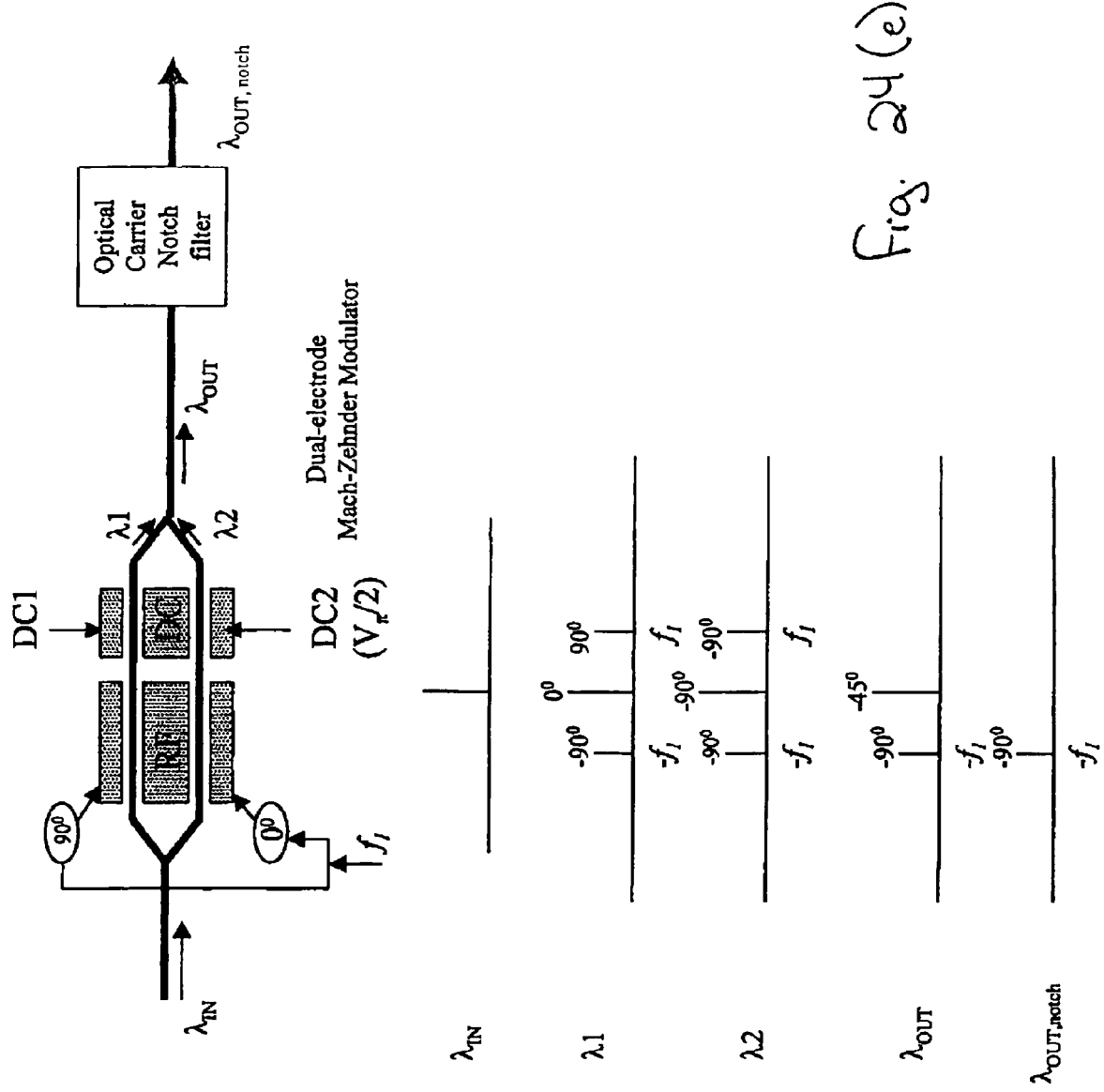
Figure 24F:
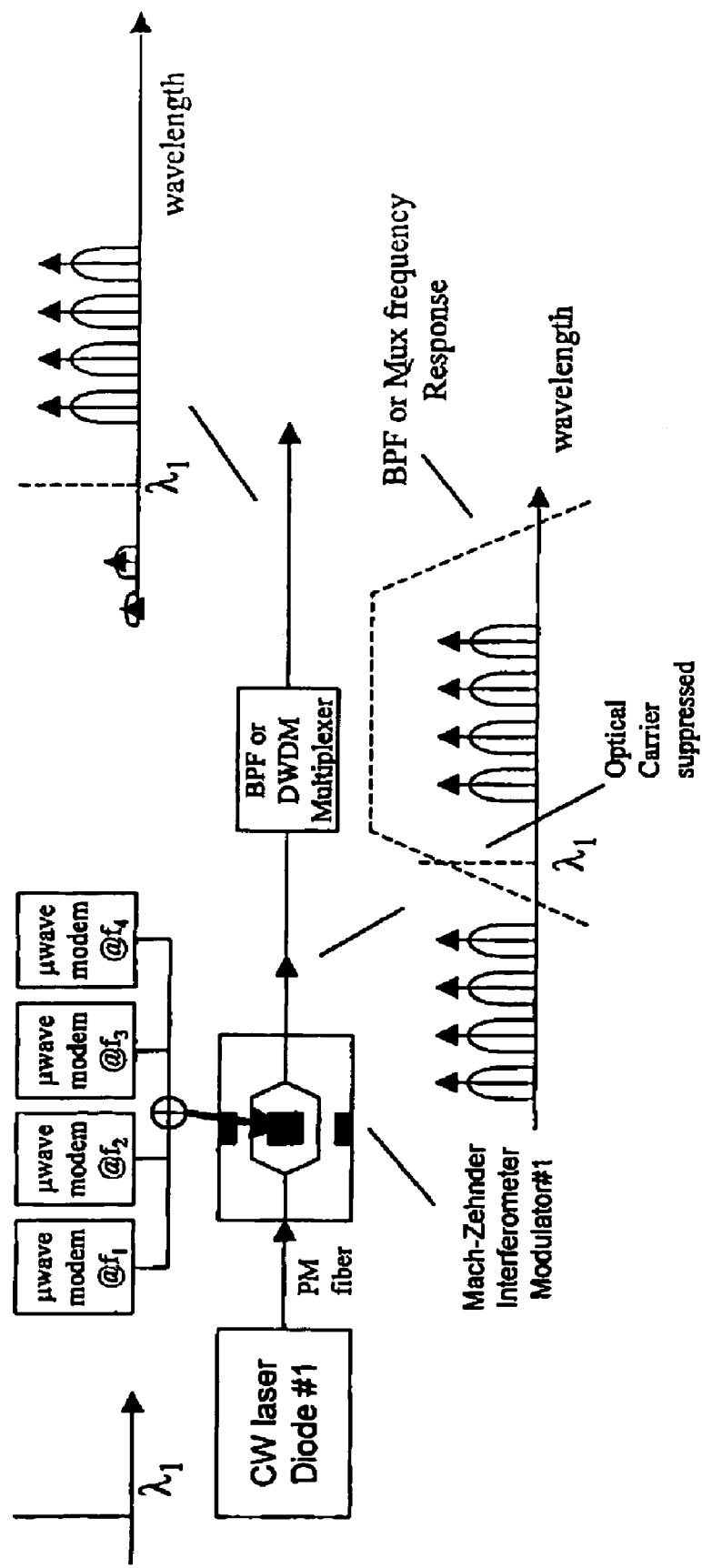

FIGS. 4(f) to 24(j) show various preferred embodiments. In FIG. 24(f), for an ITU window centered at $\lambda_0$, we use a wavelength-locked laser centered at $\lambda_1$ (equals to $\lambda_0-\Delta\lambda$ or $\lambda_0+\Delta\lambda$), where $\Delta\lambda$ is the offset wavelength. The output of the laser is connected to the input of an MZI modulator via a polarization-maintaining fiber. The MZI modulator is modulated by multi-channel RF/microwave signals. These RF/microwave signals can b of any modulation type that can be demodulated by a narrowband channel optical filter and envelop detection, for example, amplitude-shifted-keying (ASK) signals. The modulation on the MZI is based on ODSB technique mentioned previously in FIG. 24(c). Consequently, the outputs of each MZI are double-sideband signals with suppressed carrier as shown in FIG. 24(a). The double-sideband signals are then sent to a narrowband optical bandpass filter (BPF) or DWDM multiplexer. The center frequency of the BPF or the DWDM multiplexer is at $\lambda_0$, and its pass-band is just enough to pass one sideband of each modulating signal. The BPF or DWDM multiplexer can be designed such that (1) its pass-band is just enough to pass a group of singlesideband signals under all environmental variations (e.g., temperature change, and (2) its edge roll-off can be sharp enough to cut off the unwanted single sidebands on another side of the optical carrier. The wanted single-sidebands should also stay away from the edge of the BPF or DWDM multiplexer to avoid being affected by the nonlinear phase/group delay occurring at the filter band-edges.

An alternative approach is shown in FIG. 24(g). For an ITU window centered at $\lambda_0$, we use two wavelength-locked lasers centered at $\lambda_1$ ($=\lambda_0-\Delta\lambda$) and $\lambda_2$ ($=\lambda_0=\Delta\lambda$). The output of each laser is connected to the input of an MZI modulator via a polarization-maintaining fiber. In this case, the modulation bandwidth of each MZI modulator can be half of that used in FIG. 24(f). Each MZI modulator is also modulated by multi-channel RF/microwave signals, but the number of signals is half of that in FIG. 24(f). The outputs of each MZI are also double-sideband signals with suppressed carrier. The first ODSB output from the upper MZI in FIG. 24(f) & 24(g) is centered at $\lambda_1$, and the other ODSB output from the lower MZI in FIG. 24(f) & 24(g) is centered at $\lambda_2$. The two ODSB signals are then combined and sent to an optical or multiplexer. The center frequency of the BPF or the DWDM multiplexer is at $\lambda_0$, and its pass-band is just enough to pass one sideband of each modulating signal. Shown in FIG. 24(f) & 24(g) are four different modulating signals which can be passed through the BPF or DWDM multiplexer. The final result is an output signal consisting of four different single-sidebands of information. Note that $f_1$ and $f_2$ of the subcarrier multiplexed signals should be high enough such that the unwanted single sidebands can be eliminated more completely.

Figure 24H:
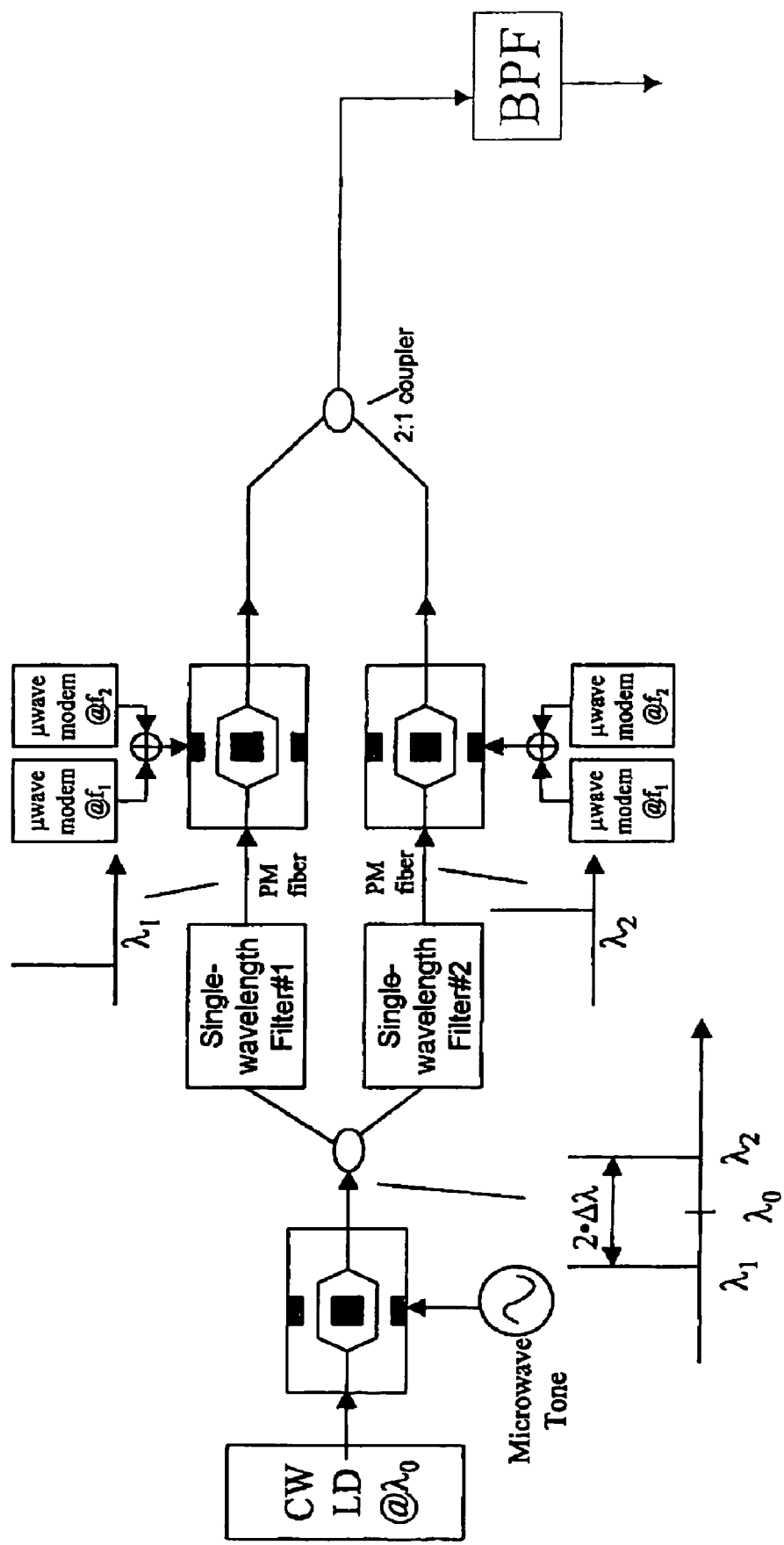

Instead if two independent lasers to generate the offset optical carriers as shown in FIG. 24(f) & 24(g), one can also use single optical source to generate two offset optical carriers. The first such approach is shown in FIG. 24(h), where a ODSB transmitter is being used to generate two offset optical carriers. The ODSB transmitter is modulated by a microwave CW tone at carrier frequency given by ($\frac{1}{2}$)($c/\lambda_1 - c/\lambda_2$)=$c\Delta\lambda/(\lambda_1\lambda_2)$ where c is the speed of the light. Two narrowband optical filters are used to filter out the optical carriers at $\lambda_1$ and $\lambda_2$, respectively. The rest of the operation principle is the same as that in FIG. 24(f) & 24(g).

Figure 24I:
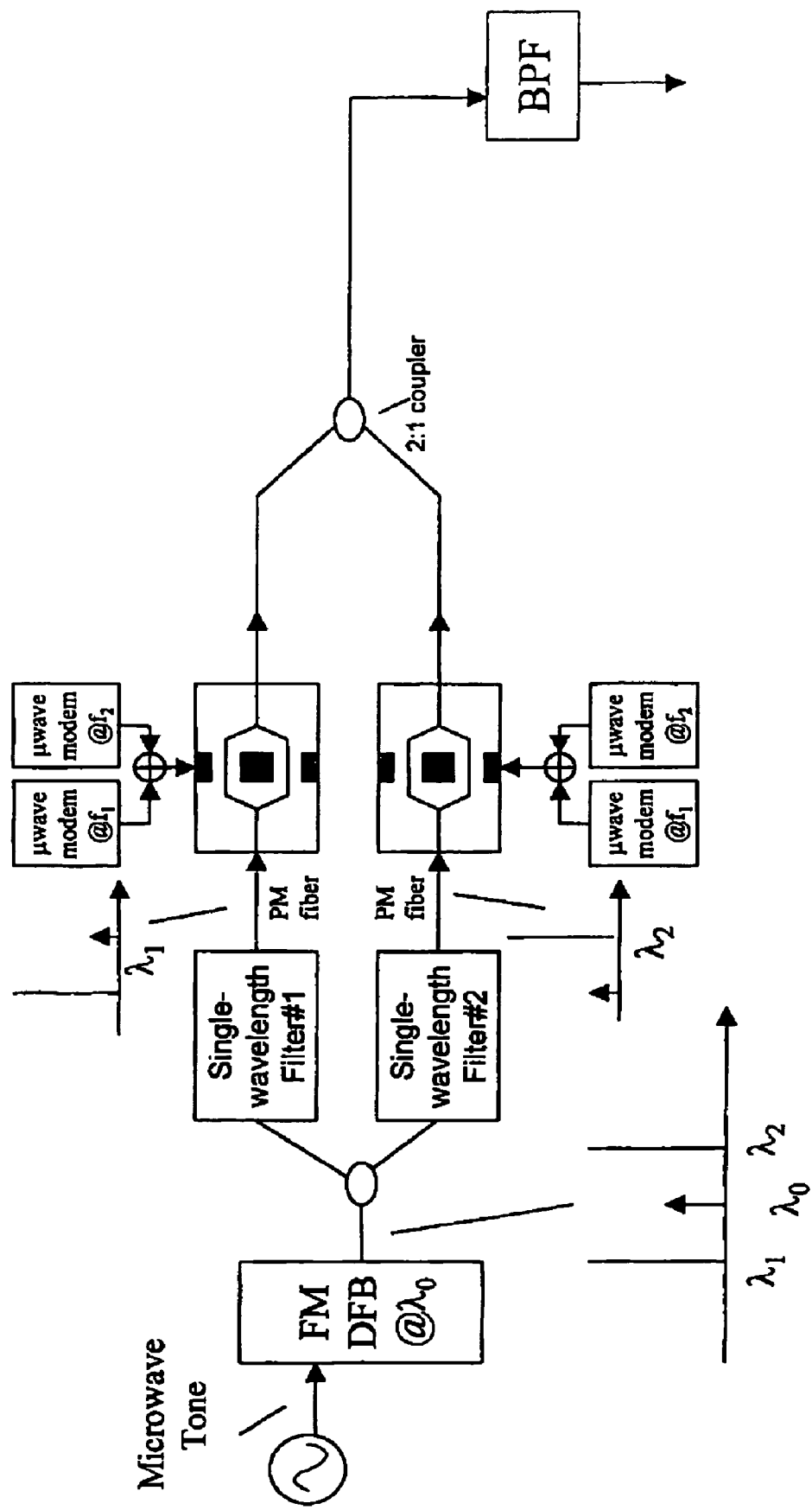
Figure 34I:
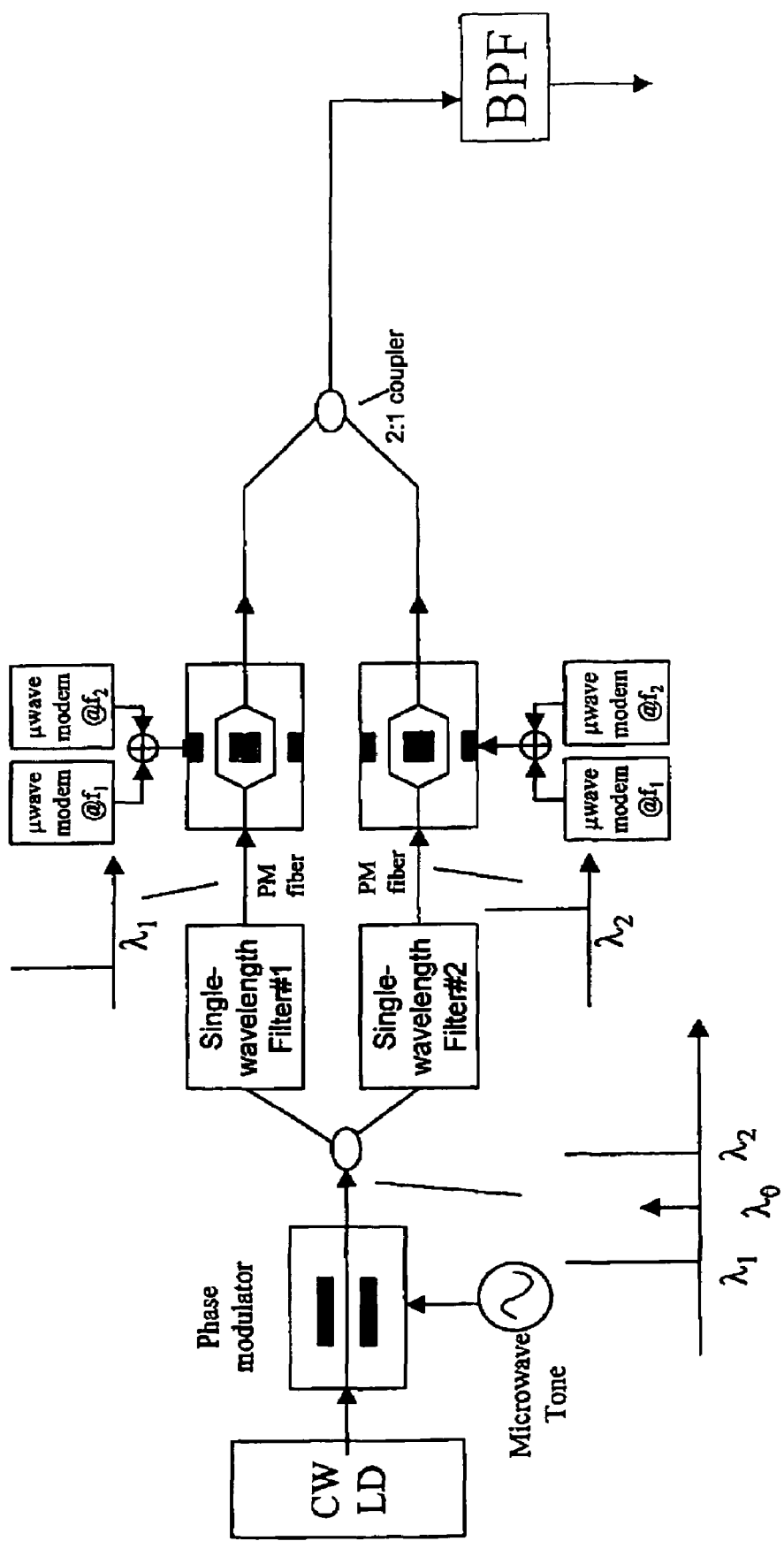

The second such approach is to use a direct frequency-modulated (FM) LD as the two offset-optical-carrier generating source, as shown in FIG. 24(i). According to the basic FM modulation theory, when the FM modulation index $\beta$ equals 2.4, the center carrier disappears, and the two sidebands reach a maximum value.

The third such approach is to use a direct phase-modulated (PM) LD as the two offset-optical-carrier generating source, as shown in FIG. 24(j). According to the basic PM modulation theory, when the PM modulation index $\beta_p$ equals 2.4, the center carrier disappears and the two sidebands reach a maximum value.

What is claimed is:

1. An optical network, comprising:
   a fiber ring of a single fiber, the fiber ring comprising a plurality of network nodes communicating via optical signals at different signal wavelengths in a first propagation direction and replicas of the optical signals at different replica signal wavelengths from the optical signals in a second, opposite propagation direction in the single fiber of the fiber ring, each network node comprising;
   a first optical path operable to receive light from the fiber ring in the first propagation direction only, the first optical path comprising a first optical amplifier to amplify light, a first drop coupler operable to drop a portion of light at all wavelengths from the first optical path while allowing a remaining portion of light of all wavelengths to pass through to a next network node downstream in the first propagation direction, and a first add coupler to add light to the first optical path,
   a second optical path operable to receive light from the fiber ring in the second propagation direction only, the second optical path comprising a second optical amplifier to amplify light, a second drop coupler operable to drop a portion of light at all wavelengths from the second optical path while allowing a remaining portion of light of all wavelengths to pass through to a next network node downstream in the second propagation direction, and a second add coupler to add light to the second optical path,
   a first optical port connected to couple a first end of the first optical path and a first end of the second optical path to the fiber ring and to direct light in the first propagation direction in the fiber ring to the first optical path and light in the second propagation direction in the second optical path into the fiber ring,
   a second optical port connected to couple a second end of the first optical path and a second end of the second optical path to the fiber ring and to direct light in the first propagation direction in the first optical path to the fiber ring and light in the second propagation direction in the fiber ring into the second optical path,
   a signal add module operable to produce a first add signal at a first wavelength carrying data and a second add signal at a second wavelength carrying the same data as in the first add signal and connected to couple the first add signal to the first optical path via the first add coupler and the second add signal to the second optical path via the second add coupler, and
   a signal drop module operable to receive a first drop signal from the first optical path via the first drop coupler and a second drop signal from the second optical path via the second drop coupler.

2. The optical network as in claim 1, wherein the signal add module comprises:
   a first optical transmitter operating at the first wavelength to produce the first add signal in response to the same data, and
   a second optical transmitter operating at the second wavelength to produce the second add signal in response to the same data.

3. The optical network as in claim 2, wherein the signal drop module comprises:
   an optical coupler coupled to the first and second drop couplers to receive the first and second drop signals,
   a tunable optical filter to receive and filter the first and second drop signals, and
   an optical receiver to receive light filtered by the tunable optical filter.

4. The optical network as in claim 2, further comprising an optical switching mechanism in the fiber ring to maintain a single break point in the single fiber of the fiber ring.

5. The optical network as in claim 4, further comprising a central hub in the fiber ring, wherein the optical switching mechanism includes an optical switch in the central hub.

6. The optical network as in claim 1, wherein the signal add module comprises:
   a single optical transmitter to produce light at different wavelengths and to produce the first, add signal and the second add signal, respectively, to carry the same data.

7. The optical network as in claim 6, wherein the signal add module further comprises:
   an optical splitter to split the light from the single optical transmitter into a first light beam and a second light beams;
   a first optical filter to filter the first light beam to transmit only light at the first wavelength as the first add signal; and
   a second optical filter to filter the second light beam to transmit only light at the second wavelength as the second add signal.

8. The optical network as in claim 6, wherein the signal drop module comprises:
   an optical coupler coupled to the first and second drop coupler to receive the first and second drop signals,
   a tunable optical filter to receive and filter the first and second drop signals, and
   an optical receiver to receive light filtered by the tunable optical filter.

9. The optical network as in claim 6, further comprising an optical switching mechanism in the fiber ring to maintain a single break point in the fiber ring.

10. The optical network as in claim 9, wherein the optical switching mechanism comprises an optical switch in the fiber ring which switches open or close to maintain a single break point in the fiber ring in response to whether there is a break point in the fiber ring.

11. The optical network as in claim 9, further comprising a central hub in the fiber ring, wherein the optical switching mechanism includes an optical switch in the central hub and wherein the optical switch switches open or close to maintain a single break point in the fiber ring in response to whether there is a break point in the fiber ring.

12. The optical network as in claim 1, further comprising a central hub in the fiber ring to include an optical switch to maintain a single break point for each optical signal in the fiber ring, wherein the optical switch is open when there is no break point in the fiber ring and is closed when there is a break point in the fiber ring.

13. The optical network as in claim 1, wherein the first and second optical ports are optical circulators.

14. The optical network as in claim 1, wherein each coupler as a broadband optical coupler.

15. The optical network as in claim 1, further comprising an optical switching mechanism in the fiber ring to maintain a single break point in the fiber ring.

16. The optical network as in claim 15, wherein the optical switching mechanism comprises an optical switch in the fiber ring which switches open or close to maintain a single break point in the fiber ring in response to whether there is a break point in the fiber ring.

17. The optical network as in claim 15, further comprising a central hub in the fiber ring, wherein the optical switching mechanism includes an optical switch in the central hub.

18. The optical network as in claim 17, further comprising optical supervision channel mechanism which provides out-of-band optical supervision channel signals in the first and second propagation directions in the fiber ring that carry information of control and management of the fiber ring.

19. The optical network as in claim 18, wherein the optical signals are C-band signals and the out-of-band optical supervision channel, signals are out of the C-band.

20. The optical network as in claim 1, further comprising an optical supervision channel mechanism which provides optical supervision channel signals at different supervision channel wavelengths in the first and second propagation directions in the fiber ring that carry information of control and management of the fiber ring and are out of the wavelength band of the optical signals.

21. A method for optically communicating, comprising:
using a fiber ring of a single fiber to connect a plurality of network nodes and to provide communication among the network nodes via optical signals in a first propagation direction and replicas of the optical signals at different wavelengths from the optical signals in a second, opposite propagation direction in the single fiber; and
within each network node, receiving light from the fiber ring in the first propagation direction only along a first optical path,
receiving light from the fiber ring in the second propagation direction only along a second optical path,
generating a first add signal at a first wavelength to carry data and a second add signal at a second wavelength carrying the same data,
coupling the first add signal to the first optical path and the second add signal to the second optical path to add the same data in the fiber ring in the first and second propagation directions,
dropping a portion of light in all wavelengths present in the first optical path as a first drop signal from the first optical path while allowing a remaining portion of the light in all wavelengths present in the first optical path to continue to propagate to a next network node downstream in the first propagation direction, and
dropping a portion of light in all wavelengths present in the second optical path as a second drop signal while allowing a remaining portion of the light in all wavelengths present in the second optical path to continue to propagate to a next network node downstream in the second propagation direction.

22. The method as in claim 21, further comprising using two different optical transmitters respectively at first and second wavelengths to produce the first and second add signals, respectively.

23. The method as in claim 21, further comprising using a single optical transmitter in each network node to generate light that comprises the first and second add signals.

24. The method as in claim 23, further comprising:
splitting the light from the single optical transmitter into a first light beam and a second light beam,
using a first optical filter to filter the first light beam to transmit only light at the first wavelength as the first add signal; and
using a second optical filter to filter the second light beam to transmit only light at the second wavelength as the second add signal.

25. The method as in claim 21, further comprising using an optical switching mechanism in the fiber ring to maintain a single break point for an optical signal in the fiber ring.

26. The method as in claim 25, further comprising detecting a failure condition in the fiber ring to control the optical switching mechanism.

27. The method as in claim 25, further comprising providing optical supervision channel signals at different supervision channel wavelengths in the first and second propagation directions in the filter ring to carry information of control and management of the fiber ring, wherein optical supervision channel signals are out of the wavelength band of the optical signals.

28. An optical network, comprising:
a fiber ring formed of a single fiber to carry optical signals at different wavelengths in a first direction and replicas of the optical signals in a second, opposite direction;
a plurality of network nodes coupled to the fiber ring to communicate with one another via optical signals in a first propagation direction and a second, opposite propagation direction in the fiber ring; and
an optical switching mechanism in the fiber ring which comprises an optical switch that is closed when there is not a break in the fiber ring and is open when there is a break in the fiber ring,
wherein each network node comprises:
a first optical path to receive light from the fiber ring in the first propagation direction only, the first optical path comprising a first optical amplifier to amplify light, a first drop coupler to drop light from the first optical path, and a first add coupler to add light to the first optical path,
a second optical path to receive light from the fiber ring in the second propagation direction only, the second optical path comprising a second optical amplifier to amplify tight, a second drop coupler to drop light from the second optical path, and a second add coupler to add light to the second optical path,
a first optical port to couple a first end of the first optical path and a first end of the second optical path to the fiber ring and to direct light in the first propagation direction in the fiber ring to the first optical path and light in tho second propagation direction in the second optical path into the fiber ring,
a second optical port to couple a second end of the first optical path and a second end of the second optical path to the fiber ring and to direct light in the first propagation direction in the first optical path to the fiber ring and light in tho second propagation direction in the fiber ring into the second optical path, a signal add module to produce a first add signal at a first wavelength carry data and a second add signal at a second wavelength carrying the same data and couple the first add signal to the first optical path via the first add coupler and the second add signal to the second optical path via the second add coupler, and a signal drop module to receive a first drop signal from the first optical path via the first drop coupler and a second drop signal from the second optical path via the second drop coupler.

29. The optical network as in claim 28, wherein the signal add module comprises:

a first optical transmitter operating at the first wavelength to produce the first add signal in response to the same data, and a second optical transmitter operating at the second wavelength to produce the second add signal in response to the same data.

30. The optical network as in claim 28, wherein the signal drop module comprises:

an optical coupler coupled to the first and second drop couplers to receive the first and second drop signals, a tunable optical filter to receive and filter the first and second drop signals, and an optical receiver to receive light filtered by the tunable optical filter.

31. The optical network as in claim 28, wherein the signal add module comprises:

a single optical transmitter to produce light at different wavelengths and to produce the first add signal and the second add signal, respectively, to carry the maine data.

32. The optical network as in claim 31, wherein the signal add module further comprises:

an optical splitter to split the light from the single optical transmitter into a first light beam and a second light beam;

a first optical filter to filter the first light beam to transmit only light at the first wavelength as the first add signal; and a second optical filter to filter the second light beam to transmit only light at the second wavelength as the second add signal.

33. The optical network as in claim 28, wherein the first and second optical ports are optical circulators.

34. The optical network as in claim 28, wherein each coupler is a broadband optical coupler.

35. The optical network as in claim 28, further comprising an optical supervision channel mechanism which provides a first optical supervision channel signal at a first supervision channel wavelength in the first propagation direction and a second optical supervision channel signal at a second different supervision channel wavelength in the second propagation direction in the fiber ring that carry information of control and management of the fiber ring and are out of the wavelength band of the optical signals.

36. The optical network as in claim 28, further comprising a central hub in the fiber ring, wherein the optical switch is located in the central hub.

* * * * *